US010644735B2

(12) United States Patent
Kinget et al.

(10) Patent No.: US 10,644,735 B2
(45) Date of Patent: May 5, 2020

(54) CIRCUITS AND METHODS FOR DETECTING INTERFERERS

(71) Applicants: Peter R. Kinget, Summit, NJ (US); John Wright, New York, NY (US); Rabia Tugce Yazicigil, New York, NY (US)

(72) Inventors: Peter R. Kinget, Summit, NJ (US); John Wright, New York, NY (US); Rabia Tugce Yazicigil, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/676,610

(22) Filed: Aug. 14, 2017

(65) Prior Publication Data
US 2018/0219567 A1   Aug. 2, 2018

Related U.S. Application Data

(63) Continuation of application No. 15/285,474, filed on Oct. 4, 2016, now Pat. No. 9,762,273, which is a
(Continued)

(51) Int. Cl.
*H04B 1/10* (2006.01)
*H04B 17/345* (2015.01)
*H04J 13/00* (2011.01)

(52) U.S. Cl.
CPC ......... *H04B 1/1027* (2013.01); *H04B 17/345* (2015.01); *H04J 13/0029* (2013.01)

(58) Field of Classification Search
CPC ............ H03G 3/345; H03K 5/00; H03K 5/22; H03K 5/153; H03K 19/00384;
(Continued)

(56) References Cited

U.S. PATENT DOCUMENTS 5,001,441 A  3/1991 Gen-Kuong
5,629,956 A  5/1997 Durrant et al.
(Continued)

FOREIGN PATENT DOCUMENTS

EP    2662706       9/2015
WO   WO 2013152022 A1 * 10/2013 ......... H04L 27/0006

OTHER PUBLICATIONS

Adams, Douglas et al., "A Mixer Frontend for a Four-Channel Modulated Wideband Converter with 62 dB Blocker Rejection", In IEEE Radio Frequency Integrated Circuits Symposium (RFIC), San Francisco, CA, May 22-24, 2016, pp. 286-289.
(Continued)

*Primary Examiner* — Shawkat M Ali
(74) *Attorney, Agent, or Firm* — Byrne Poh LLP

(57) ABSTRACT

Mechanisms for interferer detection can detect interferers by detecting elevated signal amplitudes in one or more of a plurality of bins (or bands) in a frequency range between a maximum frequency ($f_{MAX}$) and a minimum frequency ($f_{MIN}$). To perform rapid interferer detection, the mechanisms downconvert an input signal x(t) with a local oscillator (LO) to a complex baseband signal $x_I(t)+jx_Q(t)$. $x_I(t)$ and $x_Q(t)$ are then multiplied by m unique pseudorandom noise (PN) sequences (e.g., Gold sequences) $g_m(t)$ to produce m branch signals for I and m branch signals for Q. The branch signals are then low pass filtered, converted from analog to digital form, and pairwise combined by a pairwise complex combiner. Finally, a support recovery function is used to identify interferers.

20 Claims, 15 Drawing Sheets

Related U.S. Application Data continuation-in-part of application No. PCT/US2015/050058, filed on Sep. 14, 2015.

(60) Provisional application No. 62/236,959, filed on Oct. 4, 2015, provisional application No. 62/049,785, filed on Sep. 12, 2014.

(58) Field of Classification Search
CPC .. H03M 1/00; H03M 7/30; H04B 1/06; H04B 1/16; H04B 1/69; H04B 1/707; H04B 1/713; H04B 1/1027; H04B 1/7097; H04B 17/345; H04J 13/0029; H04L 27/06; H04N 5/44; H04N 5/46; H04N 5/211; H04N 5/4401
USPC ............... 327/80, 81, 82, 91; 341/121, 122; 375/132, 136, 137, 144, 152, 316, 343, 375/350; 455/130, 166, 207, 333
See application file for complete search history.

(56) References Cited

U.S. PATENT DOCUMENTS

| | | | |
|---|---|---|---|
| 5,640,416 | A | 6/1997 | Chalmers |
| 6,163,696 | A | 12/2000 | Bi et al. |
| 6,351,290 | B1 | 2/2002 | Limberg |
| 6,621,804 | B1 | 9/2003 | Holtzman et al. |
| 6,882,834 | B1 | 4/2005 | Balboni |
| 7,103,316 | B1 | 9/2006 | Hall |
| 7,266,360 | B2 | 9/2007 | Kang et al. |
| 7,787,852 | B2 | 8/2010 | Rofougaran |
| 8,166,084 | B2 | 4/2012 | Hahn et al. |
| 8,285,243 | B2 | 10/2012 | Kang et al. |
| 8,391,340 | B2 | 3/2013 | Weill |
| 8,457,579 | B2 | 6/2013 | Mishali et al. |
| 8,571,504 | B2 | 10/2013 | Robert et al. |
| 8,594,603 | B2 | 11/2013 | Balankutty et al. |
| 8,629,714 | B2 | 1/2014 | Ng et al. |
| 8,761,065 | B2 | 6/2014 | Stephens et al. |
| 8,836,557 | B2 | 9/2014 | Eldar et al. |
| 8,971,911 | B2 | 3/2015 | Barnawi |
| 9,065,504 | B2 | 6/2015 | Kwon et al. |
| 9,191,891 | B2 | 11/2015 | Jafarian et al. |
| 9,413,420 | B1 | 8/2016 | Kong |
| 2001/0041548 | A1 | 11/2001 | Bult et al. |
| 2004/0266356 | A1 | 12/2004 | Javor et al. |
| 2006/0222116 | A1 | 1/2006 | Hughes et al. |
| 2006/0103362 | A1 | 5/2006 | Eberlein |
| 2006/0198474 | A1 | 9/2006 | Sorrells et al. |
| 2008/0069183 | A1 | 3/2008 | Terada |
| 2008/0108318 | A1 | 5/2008 | Min et al. |
| 2008/0214139 | A1 | 9/2008 | Conta et al. |
| 2009/0066446 | A1 | 3/2009 | Sahu et al. |
| 2009/0267655 | A1 | 10/2009 | Chen et al. |
| 2009/0323779 | A1 | 12/2009 | Lennen |
| 2010/0302100 | A1* | 12/2010 | Yang ............... G01S 19/33 342/357.73 |
| 2011/0007780 | A1 | 1/2011 | Shimoni |
| 2011/0221518 | A1 | 9/2011 | Romero |
| 2012/0144063 | A1 | 6/2012 | Menchaca et al. |
| 2012/0235801 | A1 | 9/2012 | Cho et al. |
| 2012/0249234 | A1 | 10/2012 | Robert et al. |
| 2012/0252394 | A1 | 10/2012 | Balakrishnan et al. |
| 2012/0314822 | A1 | 12/2012 | Gupta |
| 2013/0136154 | A1 | 5/2013 | Chomal et al. |
| 2013/0149983 | A1 | 6/2013 | Fahim et al. |
| 2013/0286903 | A1 | 10/2013 | Khojastepour et al. |
| 2013/0336368 | A1 | 12/2013 | Arima et al. |
| 2014/0070987 | A1* | 3/2014 | Jarvis ............... G01S 19/22 342/357.21 |
| 2014/0099901 | A1 | 4/2014 | Ruegamer et al. |
| 2014/0269849 | A1 | 9/2014 | Abdelmonem et al. |
| 2014/0323071 | A1 | 10/2014 | Liao |
| 2014/0370833 | A1 | 12/2014 | Din et al. |
| 2015/0072635 | A1 | 3/2015 | Atalla et al. |
| 2015/0105067 | A1 | 4/2015 | Vallaippan et al. |
| 2016/0211872 | A1 | 7/2016 | Sim et al. |

OTHER PUBLICATIONS

Agilent Technologies, "Fundamentals of RF and Microwave Noise Figure Measurements", Technical Paper, Application Note 57-1, Aug. 5, 2010, pp. 1-31.

Agilent Technologies, "Spectrum Analysis Basics", Technical Paper, Application Note 150, Feb. 25, 2014, pp. 1-89.

Alink et al., "A 50MHz-to-1.5GHz Cross-Correlation CMOS Spectrum Analyzer for Cognitive Radio with 89dB SFDR in 1MHz RBW", in IEEE DySpan 2010, Singapore, SG, Apr. 2010, pp. 1-6.

Alink et al., "A CMOS-Compatible Spectrum Analyzer for Cognitive Radio Exploiting Crosscorrelation to Improve Linearity and Noise Performance", in IEEE Transaction on Circuits and Systems—I, vol. 59, Mar. 2012, pp. 479-492.

Alink, Mark S.O. et al., "Using Cross Correlation to Mitigate Analog/RF Impairments for Integrated Spectrum Analyzers", in IEEE Transaction on Microwave Theory and Techniques, vol. 61, No. 3, Mar. 2013, pp. 1327-1337.

Ammar, Yasmin et al., "An Ultra-Low Power Wake Up Receiver with Flip Flops Based Address Decoder", In the 12th International Multi-Conference on Systems, Signals & Devices (SSD), Sakiet Ezzit Sfax, TN, Mar. 16-19, 2015, pp. 1-5.

Andrews, C. and Molnar, A., "A Passive Mixer-First Receiver With Digitally Controlled and Widely Tunable RF Interface", In IEEE Journal of Solid-State Circuits, vol. 45, No. 12, Dec. 2010, pp. 2696-2708.

Andrews, C. and Molnar, A., "A Passive-Mixer-First Receiver with Baseband-Controlled RF Impedance Matching, 6dB NF, and 27dBm Wideband IIP3", In IEEE International Solid-State Circuits Conference (ISSCC) Digest of Technical Papers, San Francisco, CA, US, Feb. 7-11, 2010, pp. 46-47.

Anttila, Lauri et al., "Circularity-Based I/O Imbalance Compensation in Wideband Direct-Conversion Receivers", In IEEE Transactions on Vehicular Technology, vol. 57, No. 4, Jul. 2008, pp. 2099-2113.

Aparin, V. et al., "An Integrated LMS Adaptive Filter of TX Leakage for CDMA Receiver Front Ends", In IEEE Journal of Solid-State Circuits, vol. 41, No. 5, May 2006, pp. 1171-1182.

Aparin, V., "A New Method of TX Leakage Cancelation in W/CDMA and GPS Receivers", In IEEE Proceedings of the Radio Frequency Integrated Circuits Symposium (RFIC '08), Digest of Technical Papers, Atlanta, GA, US, Jun. 15-17, 2008, pp. 87-90.

Ayazian, S. and Gharpurey, R., "Feedforward Interference Cancellation in Radio Receiver Front-ends", In IEEE Transactions in Circuits and Systems II: Express Briefs, vol. 54, No. 10, Oct. 2007, pp. 902-906.

Bagheri et al., "An 800-MHz-6-GHz Software-Defined Wireless Receiver in 90-nm CMOS", in IEEE Journal of Solid-State Circuits, vol. 41, No. 12, Dec. 2006, pp. 2860-2688.

Balankutty, A. and Kinget, P., "An Ultra-Low Voltage, Low-Noise, High Linearity 900-MHz Receiver With Digitally Calibrated In-Band Feed-Forward Interferer Cancellation in 65-nm CMOS", In IEEE Journal of Solid-State Circuits, vol. 46, No. 10, Oct. 2011, pp. 2268-2283.

Bardin, Joseph C. et al., "A 0.5-20 GHz Quadrature Downconverter", In IEEE Bipolar/BiCMOS Circuits and Technology Meeting (BCTM), Monterey, CA, US, Oct. 13-15, 2008, pp. 186-189.

Bdiri, Sadok and Derbel, Faouzi, "A Nanowatt Wake-Up Receiver for Industrial Production Line", In the 11th International Mult-Conference on Systems, Signals & Devices (SSD), Barcelona, SP, Feb. 11-14, 2014, pp. 1-6.

Bdiri, Sadok and Derbel, Faouzi, "An Ultra-Low Power Wake-Up Receiver for Real-Time Constrained Wireless Sensor Networks", In the AMA Conferences 2015—Sensor 2015 and IRS 2015, Nurnberg, DE, May 19-21, 2015, pp. 612-617.

Blaakmeer et al., "Wideband Balun-LNA With Simultaneous Output Balancing, Noise-Canceling and Distortion-Canceling", in IEEE Journal of Solid-State Circuits, vol. 43, No. 6, Jun. 2008, pp. 1341-1350.

(56) References Cited

OTHER PUBLICATIONS

Borremans, J. et al. "Low-area Active-feedback Low-noise Amplifier Design in Scaled Digital CMOS", In IEEE Journal of Solid-State Circuits, vol. 43, No. 11, Nov. 2008, pp. 2422-2433.
Braun, Martin et al., "Signal Detection for Cognitive Radios with Smashed Filtering", In VTC Spring 2009—IEEE 69th Vehicular Technology Conference, Barcelona, SP, Apr. 26-29, 2009, pp. 1-5.
Bruccoleri et al., "Wide-Band CMOS Low-Noise Amplifier Exploiting Thermal Noise Canceling", in IEEE Journal of Solid-State Circuits, vol. 39, No. 2, Feb. 2004, pp. 275-282.
Candes, Emmanuel et al., "Decoding by Linear Programming", In IEEE Transactions on Information Theory, vol. 51, No. 12, Dec. 2005, pp. 4203-4215.
Candes, Emmanuel et al., "Robust Uncertainty Principals: Signal Reconstruction from Highly Incomplete Frequency Information", In IEEE Transactions on Information Theory, vol. 52, No. 2, Feb. 2006, pp. 489-509.
Chen et al., "A Sub-Nyquist Rate Compressive Sensing Data Acquisition Front-End", In IEEE Journal on Emerging and Selected Topics in Circuits and Systems, vol. 2, No. 3, Sep. 2012, pp. 542-551.
Chen, R. and Hashemi, H., "A 0.5-to-3 GHz Software-Defined Radio Receiver using Sample Domain Signal Processing", In Proceedings of IEEE Radio Frequency Integrated Circuits Symposium (RFIC), Seattle, WA, US, Jun. 2-4, 2013, pp. 315-318.
Cherry, E. and Hooper, D., "The Design of Wide-Band Transistor Feedback Amplifiers", in Proceedings of the Institution of Electrical Engineers, vol. 110, No. 2, Feb. 1963, pp. 375-389.
Darabi, H. et al., "Highly Integrated and Tunable RF Front Ends for Reconfigurable Multiband Transceivers: A Tutorial", In IEEE Transactions on Circuits and Systems I: Regular Papers , vol. 58, No. 9, Sep. 2011, pp. 2038-2050.
Darabi, H., "A Blocker Filtering Technique for SAW-Less Wireless Receivers", in IEEE Journal of Solid-State Circuits, vol. 42, No. 12, Dec. 2007, pp. 2766-2773.
Darvishi, M. et al., "A 0.1-to-1.2GHz Tunable 6th-Order N-Path Channel-Select Filter with 0.6dB Passband Ripple and +7dBm Blocker Tolerance", in Papers IEEE International Solid-State Circuits Conference (ISSCC) Digest of Technical, San Francisco, CA, US, Feb. 2013, pp. 172-174.
Davis, Geoffrey et al., "Adaptive Greedy Approximations", In Constructive Approximation, vol. 13, No. 1, Mar. 1997, pp. 57-98.
Dominguez-Jimenez, M.E. et al., "Analysis and Design of Multirate Synchronus Sampling Schemes for Sparse Multiband Signals", In the Proceedings of the 20th European Signal Processing Conference (EUSIPCO), Bucharest, ROU, Aug. 27-31, 2012, pp. 1184-1188.
Donoho D., "Compressive Sensing", Department of Statistics, Stanford University, Sep. 2004, pp. 1-34.
Donoho, David L., "For Most Large Underdetermined Systems of Equations, the minimal I Norm Near Solution Approximates the Sparsest Solution", In Communications on Pure and Applied Mathematics, vol. 59, No. 7, Jul. 2006, pp. 907-934.
Durante, Marco S. and Mahlknecht, Stefan, "An Ultra-Low Power Wake-Up Receiver for Wireless Sensor Nodes", In Proceedings of the 3rd International Conference on Sensor Technologies and Applications (SENSORCOMM '09), Athens, GR, Jun. 18-23, 2009, pp. 167-170.
Fleyer, Michael et al., "Multirate Synchronus Sampling of Sparse Multiband Signals", In IEEE Transactions on Signal Processing, vol. 58, No. 3, Mar. 2010, pp. 1144-1156.
Fong, K.L., "Dual-band High-linearity Variable-gain Low-noise Amplifiers for Wireless Applications", In IEEE International Solid-State Circuits Conference (ISSCC) Digest of Technical Papers, Feb. 1999, pp. 224-225.
Geis, A. et al., "A 0.045mm2 0.1-6GHz Reconfigurable Multi-Band, Multi-Gain LNA for SDR", In Proceedings of IEEE Radio Frequency Integrated Circuits Symposium (RFIC), Anaheim, CA, US, May 23-25, 2010, pp. 123-126.

Ghaffari, A. et al., "8-Path Tunable RF Notch Filters for Blocker Suppression", In IEEE International Solid-State Circuits Conference (ISSCC) Digest of Technical Papers, Feb. 2012, pp. 76-78.
Ghaffari, A. et al., "Tunable High-Q N-Path Band-Pass Filters: Modeling and Verification", In IEEE Journal of Solid-State Circuits, vol. 46, No. 5, May 2011, pp. 1-29.
Ghaffari, A. et al., "Tunable N-path Notch Filters for Blocker Suppression: Modeling and Verification", In IEEE Journal of Solid-State Circuits, vol. 48, No. 6, Jun. 2013, pp. 1370-1382.
Giannini, V. et al., "A 2-mm 0.1-5 GHz Software-defined Radio Receiver in 45-nm Digital CMOS", In IEEE Journal of Solid-State Circuits, vol. 44, No. 12, Dec. 2009, pp. 3486-3498.
Goel et al., "A 130-nm CMOS 100-Hz-6-GHz Reconfigurable Vector Signal Analyzer and Software-Defined Receiver", In IEEE Transactions on Microwave Theory and Techniques, May 2012, pp. 1-15.
Gold, R., "Optimal Binary Sequences for Spread Spectrum Mulitplexing (Correspondence)," in IEEE Transactions on Information Theory, vol. 13, Oct. 1967, pp. 619-621.
Han, H.G. and Kim, T.W., "A CMOS RF Programmable-Gain Amplifier for Digital TV With a + 9-dBm IIP3 Cross-Coupled Common-Gate LLA", In IEEE Transactions on Circuits and Systems II: Express Briefs , vol. 59, No. 9, Sep. 2012, pp. 543-547.
Haque et al. "Theory and Design of a Quadrature Analog-to-InformationConverterforEnergy-Efficient Wideband Spectrum Sensing", In IEEE Transactions on Circuits and Systems—I, vol. 62, No. 2, Feb. 2015, pp. 527-535.
He, X. and Kundur, H., "A Compact SAW-less Multiband WCDMA/GPS Receiver Front-End with Translational Loop for Input Matching", In IEEE International Solid-State Circuits Conference (ISSCC) Digest of Technical Papers, Apr. 2011, pp. 372-374.
Homes, J., "Spread Spectrum Systems for GNSS and Wireless Communications", Artech House, May 2007, pp. 1-855.
Hsu et al., "A Sub-Sampling-Assisted Phase-Frequency Detector for Low-Noise PLLs With Robust Operation Under Supply Interference", in IEEE Transactions on Circuits and Systems—I, vol. 62, No. 1, Jan. 2015, pp. 90-99.
Hutu, Florin et al., "A New Wake-Up Radio Architecture for Wireless Sensor Networks", In EURASIP Journal on Wireless Communications and Networking, vol. 1, No. 177, Dec. 2014, pp. 1-10.
Ingels et al., "A 5mm2 40nm LP CMOS 0.1-to-3GHz Multistandard Transceiver", in in IEEE Internation Solid-State Circuits Conference, San Francisco, CA, US, Feb. 7-11, 2010, pp. 458-459.
International Preliminary Report on Patentability of the International Searching Authority dated Mar. 14, 2017 in International Patent Application No. PCT/US2015/050058.
International Preliminary Report on Patentability of the International Searching Authority dated Aug. 9, 2016 in International Patent Application No. PCT/US2015/015036.
International Search Report and Written Opinion dated Jan. 4, 2018 in International Patent Application No. PCT/US2017/057923.
International Search Report and Written Opinion dated Oct. 23, 2015 in International Patent Application No. PCT/US2015/015036.
International Search Report and Written Opinion of the International Searching Authority dated Dec. 22, 2015 in International Patent Application No. PCT/US2015/50058.
Izquierdo, C. et al., "Reconfigurable Wide-band Receiver with Positive Feed-back Translational Loop", In Proceedings of IEEE Radio Frequency Integrated Circuits Symposium (RFIC), Baltimore, MD, US, Jun. 5-7, 2011, pp. 1-4.
Izquierdo, C. et al., "Wide-band Receiver Architecture with Flexible Blocker Filtering Techniques", In Proceedigns of IEEE International Conference on Electronics, Circuits, Systems (ICECS), Athens, GR, Dec. 12-15, 2010, pp. 894-897.
Kaltiokallio, M. et al., "Wideband 2 to 6 GHz RF Front-end with Blocker Filtering", In IEEE Journal Solid-State Circuits, vol. 47, No. 7, Jul. 2012, pp. 1636-1645.
Kirolos, Sami et al., "Analog-to-Information Conversion via Random Demodulation", In IEEE Dallas/CAS Workshop on Design, Applications, Integration and Software, Richardson, TX, US, Oct. 29-30, 2006, pp. 71-74.

(56) References Cited

OTHER PUBLICATIONS

Kitsunezuka et al., "A 30-MHz-2.4-GHz CMOS Receiver With Integrated RF Filter and Dynamic-Range-Scalable Energy Detector for Cognitive Radio Systems", in IEEE Journal of Solid-State Circuits, vol. 47, No. 5, May 2012, pp. 1084-1093.

Kitsunezuka et al., "A 5-9-mW, 0.2-2.5-GHz CMOS Low-IF Receiver for Spectrum-Sensing Cognitive Radio Sensor Networks", in IEEE Radio Frequency Integrated Circuits Symposium, Honolulu, HI, US, Jun. 4-6, 2013, pp. 319-322.

Laska, Jason N. et al., "Theory and Implementation of an Analog-to-Information Converter Using Random Demodulation", In IEEE International Symposium on Circuits and Systems, New Orleans, LA, US, May 27-30, 2007, pp. 1959-1962.

Le, Trong N. et al., "Ultra Low-Power Asynchronous MAC Protocol using Wake-Up Radio for Energy Neutral WSN", In Proceedings of the 1st International Workshop on Energy Neutral Sensing Systems, Nov. 14, 2013, Article 10, pp. 1-6.

McHenry, Mark A. et al., "Spectrum Occupancy Measurements", NeTs-ProWIN: Characterization and Impact on Network Performance, Shared Spectrum Company, Dec. 20, 2005, pp. 1-58.

Miar, Yasin et al., "A Novel Reduced Power Compressive Sensing Technique for Wideband Cognitive Radio", In EURASIP Journal on Wireless Communications and Networking, Dec. 2012, pp. 281.

Mirzaei et al., "Analysis and Optimization of Current-Driven Passive Mixers in Narrowband Direct-Conversion Receivers", in IEEE Journal of Solid-State Circuits, vol. 44, No. 10, Oct. 2009, pp. 2678-2688.

Mirzaei, A. et al., "A 65 nm CMOS Quad-band SAW-less Receiver SoC for GSM/GPRS/EDGE", In IEEE Journal of Solid-State Circuits, vol. 46, No. 4, Apr. 2011, pp. 950-964.

Mishali, Moshe et al, "From Theory to Practice: Sub-Nyqust Sampling of Sparse Wideband Analog Signals", In IEEE Journal of Selected Topics in Signal Processing, vol. 4, No. 2, Apr. 2010, pp. 375-391.

Mishali, Moshe et al, "Wideband Spectrum Sensing at Sub-Nyquist Rates", In IEEE Signal Processing Magazine, vol. 28, No. 4, Jul. 2011, pp. 102-135.

Mishali, Moshe et al., "Blind Multiband Signal Reconstruction: Compressed Sensing for Analog Signals", in IEEE Transactions on Signal Processing, vol. 57, No. 3, Mar. 2009, pp. 993-1009.

Mitola III, Joseph, "Cognitive Radio for Flexible Mobile Mulitmedia Communications", In Mobile Networks and Applications, vol. 6, No. 5, Sep. 2001, pp. 435-441.

Murmann, B., "ADC Performance Survey 1997-2015", last updated Jul. 2016, pp. 1-4, available at: http://web.stanford.edu/~murmann/adcsurvey.html.

Murphy, D. et al., "A Blocker-Tolerant, Noise-Cancelling Receiver Suitable for Wideband Wireless Applications", In IEEE Journal of Solid-State Circuits, vol. 47, No. 12, Dec. 2012, pp. 2943-2963.

Murphy, David et al., "A Blocker-Tolerant Wideband Noise-Cancelling Receiver with a 2dB Noise Figure", In IEEE International Solid-State Circuits Conference (ISSCC), San Francisco, CA, US, Feb. 19-23, 2012, pp. 74-76.

Notice of Allowance dated May 8, 2017 in U.S. Appl. No. 15/285,474.

Notice of Allowance dated Jul. 18, 2018 in U.S. Appl. No. 15/510,910.

Notice of Allowance dated Dec. 13, 2017 in U.S. Appl. No. 15/117,662.

Office Action dated May 19, 2017 in U.S. Appl. No. 15/117,662.

Office Action dated Dec. 14, 2017 in U.S. Appl. No. 15/510,910.

Office Action dated Dec. 16, 2016 in U.S. Appl. No. 15/285,474.

Oller, Joaquim et al., "Design, Development, and Performance Evaluation of a Low-Cost, Low-Power Wake-Up Radio System for Wireless Sensor Networks", In ACM Transactions on Sensor Networks (TOSN), vol. 10, No. 1, Nov. 2013, Article 11, pp. 1-24.

Pandey, Jagdish and Otis, Brian R., "A Sub-100 µW MICS/ISm Band Transmitter Based on Injection-Locking and Frequency Multiplication", In IEEE Journal of Solid-State Circuits, vol. 46, No. 5, May 2011, pp. 1049-1058.

Park et al., "A Fully Integrated UHF-Band CMOS Receiver With Multi-Resolution Spectrum Sensing (MRSS) Functionality for IEEE 802.22 Cognitive Radio Applications", in IEEE Journal of Solid-State Circuits, vol. 44, No. 1, Jan. 2009, pp. 258-268.

Park, J.W. and Razavi, B., "A 20 mW GSM/WCDMA Receiver with RF Channel Selection", In Proceedings of IEEE International Solid-State Circuits Conference (ISSCC), San Francisco, CA, US, Feb. 9-14, 2014, pp. 356-358.

Pickholtz, Raymond L. et al, "Theory of Spread-Spectrum Communications—A Tutorial", In IEEE Transactions on Commincations, vol. 30, No. 5, May 1982, pp. 855-884.

Pletcher, Nathan M. et al., "A 52W Wake-Up Receiver with 72-dBm Sensitivity using an Uncertain-IF Architecture", In the IEEE Journal of Solid-State Circuits, vol. 44, No. 1, Jan. 2009, pp. 269-280.

Pletcher, Nathan M., "Ultra-Low Power Wake-Up Receivers for Wireless Sensor Networks", Technical Report, Department of Electrical Engineering and Computer Sciences, Univeristy of California, Berkeley, CA, US, May 20, 2008, pp. 1-164.

Pollin et al., "Digital and Analog Solution for Low-power Multi-band Sensing", in IEEE DySPAN 2010, Singapore, SG, Apr. 6-9, 2010, pp. pp. 1-2.

Polo, Yvan L. et al., "Compressive Wide-Band Spectrum Sensing", In IEEE International Conference on Acoustics, Speech and Signal Processing (ICASSP), Taipei, TW, Apr. 19-24, 2009, pp. 2337-2340.

Razavi, B., "Design Considerations for Direct-Conversion Receivers", In IEEE Transactions on Circuits and Systems, vol. 44, No. 6, Jun. 1997, pp. 428-435.

Roberts, Nathan E. and Wentzloff, David D., "A 98nW Wake-Up Radio for Wireless Body Area Networks", In the IEEE Radio Frequency Integrated Circuits Symposium (RFIC '12), Montreal, CA, Jun. 17-19, 2012, pp. 373-376.

Roberts, Nathan E. et al., "A 236nW-56.5dBm-Sensitivity Bluetooth Low-Energy Wakeup Receiver with Energy Harvesting in 65nm CMOS", In Proceedings of the International Solid-State Circuits Conference (ISSCC), San Francisco, CA, US, Feb. 11-15, 2016, pp. 450-451.

Salazar et al., "A 2.4 GHz Interferer-Resilient Wake-Up Receiver Using a Dual-IF Multi-Stage N-Path Architecture", In the IEEE Journal of Solid-State Physics, vol. 51, No. 9, Sep. 2016, pp. 2091-2110.

Selva, J., "Regularized Sampling of Multiband Signals", In IEEE Transactions on Signal Processing, vol. 58, No. 11, Nov. 2010, pp. 5624-5638.

Sen, S. et al., "A Power-Scalable Channel-Adaptive Wireless Receiver Based on Built-In Orthogonally Tunable LNA", in Transactions on Circuits and Systems I: Regular Papers, vol. 59, No. 5, May 2012, pp. 946-957.

Soer et al., "0.2-to-2.0GHz 65nm CMOS Receiver Without LNA Achieving >11dBm IIP3 and <6.5 dB NF" in IEEE International Solid-State Circuits Conference Digest of Technical Papers, Feb. 12, 2009, pp. 222-223.

Steyaert, M. and Craninckx, J., "1.1 GHz Oscillator Using Bondwire Inductance", In Electronics Letters, vol. 30, No. 3, Feb. 3, 1994, pp. 244-245.

Stoopman, Mark et al., "Co-Design of a CMOS Rectifier and Small Loop Antenna for Highly Sensitive RF Energy Harvesters", In the IEEE Journal of Solid-State Circuits, vol. 49, No. 3, Mar. 2014, pp. 622-634.

Sturm, J. et al., "A 65nm CMOS Wide-band LNA with Continuously Tunable Gain from 0dB to 24dB", In Proceedings of IEEE International Symposium on Circuits and Systems (ISCAS), Beijing, CN, May 19-23, 2013, pp. 733-736.

Tian, Zhi and Giannakis, Georgios B., "Compressed Sensing for Wideband Cognitive Radios", In IEEE International Conference on Acoustics, Speech and Signal Processing (ICASSP), Honolulu, HI, US, Apr. 15-20, 2007, Article 4, pp. 1357-1360.

Tropp et al., "Beyond Nyquist: Efficient Sampling of Sparse Bandlimited Signals", in IEEE Transactions on Information Theory, vol. 56, Jan. 2010, pp. 520-544.

Tropp et al., "Signal Recovery from Random Measurements via Orthogonal Matching Pursuit", In IEEE Transactions on Information Theory, vol. 53, No. 12, Dec. 2007, pp. 4655-4666.

Umbdenstock, Emeric et al., "Wake-Up-Receiver in Energy Efficient Wireless Sensor Networks for Security Applications", In

(56) References Cited

OTHER PUBLICATIONS

Proceedings of the 7th Edition of the Interdisciplinary Workshop on Global Security, Jan. 2013, pp. 1-4.
Viitala et al., "A Wideband Under-Sampling Blocker Detector with a 0.7-2.7GHz Mixer First Receiver", In the Proceedings of the 2015 Radio Frequency Inegrated Circuits Symposium, Phoenix, AZ, US, May 2015, pp. 1-4.
Wang, Y.H. et al., "A 2.1 to 6 GHz Tunable-band LNA With Adaptive Frequency Responses by Transistor Size Scaling", in IEEE Microwave and Wireless Components Letters, vol. 20, No. 6, Jun. 2010, pp. 346-348.
Wang, Yue et al., "A Two-Step Compressed Spectrum Sensing Scheme for Wideband Cognitive Radios", In IEEE Global Telecommunications Conference (GLOBECOM), Miami, FL, US, Dec. 6-10, 2010, pp. 1-5.
Werth, T. et al., "Active Feedback Interference Cancellation in RF Receiver Front-End", In Proceedings of IEEE Radio Frequency Integrated Circuits Symposium (RFIC), Boston, MA, US, Boston, MA, US, Jun. 7-9, 2009, pp. 379-382.
Werth, T. et al., "An Active Feedback Interference Cancellation Technique for Blocker Filtering in RF Receiver Front-Ends", In IEEE Journal of Solid-State Circuits, vol. 45, No. 5, May 2010, pp. 989-997.
Wohlmuth, Hans-Dieter and Kehrer, Daniel, "A Low Power 13-Gb/s 27-1 Pseudo Random Bit Sequence Generator IC in 120 nm Bulk CMOS", In Proceedings of the 17th Symposium on Integrated Circuits and System Design, Pernambuco, BR, Sep. 7-11, 2004, pp. 233-236.
Yang, Xianjun et al., "Random Circulant Orthogonal Matrix Based Analog Compressed Sensing", In IEEE Global Communications Conference (GLOBECOM), Anaheim, CA, US, Dec. 3-7, 2012, pp. 3605-3609.
Yazicigil et al., "A 2.7-to-3.7GHz Rapid Interferer Detector Exploiting Compressed Sampling with a Quadrature Analog-to-Information Converter", in IEEE Solid-State Circuits Conference, San Francisco, CA, US, Feb. 2015, pp. 1-3.
Ye et al., "An Ultra-Low-Power Receiver Using Transmitted-Reference and Shifted Limiters for In-Band Interference Resilience", In the Proceedings of the IEEE Solid-State Circuits Conference, San Francisco, CA, US, Jan.-Feb. 2016, pp. 438-439.
Yoo, Juhwan et al., "A 100MHz-2GHz 12.5x sub-Byquist Rate Receiver in 90nm CMOS", In IEEE Radio Frequency Integrated Circuits Symposium, Montreal, CA, Jun. 17-19, 2012, pp. 31-34.
Youssef, S. et al., "Active Feedback Receiver with Integrated Tunable RF Channel Selectivity, Distortion Cancelling, 48dB Stopband Rejection and .+12Bm Wideband IIP3, Occupying 0.06mm2 in 65nm CMOS", in Proceedings of IEEE ISSCC, San Francisco, CA, US, Feb. 19-23, 2012, pp. 166-168.
Yu et al.,"A 0.042-mm2 Fully Integrated Analog PLL with Stacked Capacitor-Inductor in 45nm CMOS", in the Proceedings of the European Solid-State Circuits Conference, Edinburgh, UK, Sep. 2008, pp. 94-97.
Yu, Zhuizhuan et al., "Mixed-Signal Parallel Compressed Sensing and Reception for Cognitive Radio", In IEEE International Conference on Acoustics, Speech and Signal Processing, Las Vegas, NV, US, Mar. 31-Apr. 4, 2008, pp. 3861-3864.
Zhang, H. and Sanchez-Sinencio, E., "Linearization Techniques for CMOS Low Noise Amplifiers: A Tutorial", in IEEE Transactions on Circuits and Systems I: Regular Papers, Jan. 2011, vol. 58, No. 1, pp. 22-36.
Zhang, Tong, "Sparse Recovery with Orthogonal Matching Pursuit Under Rip", In IEEE Transactions on Information Theory, vol. 57, No. 9, Sep. 2011, pp. 6215-6221.
Zhou, W. et al., "Using Capacitive Cross-coupling Technique in RF Low Noise Amplifiers and Down-conversion Mixer Design", In Proceedings of the European Solid-State Circuits Conference (ESSCIRC), Stockholm, SE, Sep. 19-21, 2000, pp. 77-80.

* cited by examiner

CIRCUITS AND METHODS FOR DETECTING INTERFERERS

CROSS-REFERENCE TO RELATED APPLICATION

This application is a continuation of U.S. patent application Ser. No. 15/285,474, filed Oct. 4, 2016, which claims the benefit of U.S. Provisional Patent Application No. 62/236,959, filed Oct. 4, 2015, and which is a continuation in part of International Patent Application No. PCT/US2015/050058, filed Sep. 14, 2015, which claims the benefit of U.S. Provisional Patent Application No. 62/049,785, filed Sep. 12, 2014, each of which is hereby incorporated by reference herein in its entirety.

STATEMENT REGARDING GOVERNMENT FUNDED RESEARCH

This invention was made with government support under Grant #: ECCS-1343282 awarded by the National Science Foundation. The government has certain rights in the invention.

BACKGROUND

As more and more devices utilize radio frequency techniques to effect wireless communication and control, available spectral resources become fewer and fewer. In attempt to address this situation, certain techniques, such as cognitive radio, allow opportunistic use of available spectral resources.

In many of these techniques, before a device can use a certain part of the radio frequency spectrum, it is desirable for the device to first determine whether there are interferers that may interfere with the device's use of the part of the spectrum.

While certain techniques for detecting interferers exist, these techniques are slow or energy inefficient.

Accordingly, new mechanisms for detecting interferers are desired.

SUMMARY

In accordance with some embodiments, circuits and methods for detecting interferers are provided. In some embodiments, circuits for detecting interferers are provided, the circuits comprising: a first in-phase mixer that receives and mixes a radio frequency (RF) signal and an in-phase local oscillator signal to produce a first in-phase mixer output signal; a first quadrature-phase mixer that receives and mixes the radio frequency (RF) signal and a quadrature-phase local oscillator signal to produce a first quadrature-phase mixer output signal; a first in-phase filter that receives and filters the first in-phase mixer output signal and produces a first in-phase filtered signal; a first quadrature-phase filter that receives and filters the first quadrature-phase mixer output signal and produces a first quadrature-phase filtered signal; a first in-phase branch that comprises: a second in-phase mixer that receives and mixes the first in-phase filtered signal and a first pseudorandom noise signal to produce a second in-phase mixer output signal; a second in-phase filter that receives and filters the second in-phase mixer output signal to produce a second in-phase filtered signal; and a first in-phase analog-to-digital converter that receives the second in-phase filtered signal and produces a first in-phase digitized signal; a second in-phase branch that comprises: a third in-phase mixer that receives and mixes the first in-phase filtered signal and a second pseudorandom noise signal to produce a third in-phase mixer output signal; a third in-phase filter that receives and filters the third in-phase mixer output signal to produce a third in-phase filtered signal; and a second in-phase analog-to-digital converter that receives the third in-phase filtered signal and produces a second in-phase digitized signal; a first quadrature-phase branch that comprises: a second quadrature-phase mixer that receives and mixes the first quadrature-phase filtered signal and the first pseudorandom noise signal to produce a second quadrature-phase mixer output signal; a second quadrature-phase filter that receives and filters the second quadrature-phase mixer output signal to produce a second quadrature-phase filtered signal; and a first quadrature-phase analog-to-digital converter that receives the second quadrature-phase filtered signal and produces a first quadrature-phase digitized signal; a second quadrature-phase branch that comprises: a third quadrature-phase mixer that receives and mixes the first quadrature-phase filtered signal and the second pseudorandom noise signal to produce a third quadrature-phase mixer output signal; a third quadrature-phase filter that receives and filters the third quadrature-phase mixer output signal to produce a third quadrature-phase filtered signal; and a second quadrature-phase analog-to-digital converter that receives the third quadrature-phase filtered signal and produces a second quadrature-phase digitized signal; a complex combiner that combines the first in-phase digitized signal and the first quadrature-phase digitized signal to produce a first combined signal and that combines the second in-phase digitized signal and the second quadrature-phase digitized signal to produce a second combined signal; and at least one hardware processor that receives the first combined signal and the second combined signal and that identifies at least one interferer in the RF signal using the first combined signal and the second combined signal.

In some embodiments, methods for detecting interferers are provided, the methods comprising: mixing a radio frequency (RF) signal and an in-phase local oscillator signal to produce a first in-phase mixer output signal; mixing the radio frequency (RF) signal and a quadrature-phase local oscillator signal to produce a first quadrature-phase mixer output signal; filtering the first in-phase mixer output signal to produce a first in-phase filtered signal; filtering the first quadrature-phase mixer output signal to produce a first quadrature-phase filtered signal; mixing the first in-phase filtered signal and a first pseudorandom noise signal to produce a second in-phase mixer output signal; filtering the second in-phase mixer output signal to produce a second in-phase filtered signal; analog-to-digital converting the second in-phase filtered signal to produce a first in-phase digitized signal; mixing the first in-phase filtered signal and a second pseudorandom noise signal to produce a third in-phase mixer output signal; filtering the third in-phase mixer output signal to produce a third in-phase filtered signal; analog-to-digital converting the third in-phase filtered signal to produce a second in-phase digitized signal; mixing the first quadrature-phase filtered signal and the first pseudorandom noise signal to produce a second quadrature-phase mixer output signal; filtering the second quadrature-phase mixer output signal to produce a second quadrature-phase filtered signal; analog-to-digital converting the second quadrature-phase filtered signal to produce a first quadrature-phase digitized signal; mixing the first quadrature-phase filtered signal and the second pseudorandom noise signal to produce a third quadrature-phase mixer output signal; filtering the third quadrature-phase mixer output signal to produce a third quadrature-phase filtered signal; analog-to-digital converting the third quadrature-phase filtered signal to produce a second quadrature-phase digitized signal; combining the first in-phase digitized signal and the first quadrature-phase digitized signal to produce a first combined signal and combining the second in-phase digitized signal and the second quadrature-phase digitized signal to produce a second combined signal; and identifying at least one interferer in the RF signal using the first combined signal and the second combined signal.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments, mechanisms (which can include circuits, systems, methods, and computer readable media) for detecting interferers in a frequency range are provided.

The mechanisms described herein for interferer detection can detect interferers by detecting elevated signal amplitudes in one or more of a plurality of bins (or bands) in a frequency range between a maximum frequency ($f_{MAX}$) and a minimum frequency ($f_{MIN}$) in some embodiments. Any suitable number of bins (or bands) (which number is referred to herein as No) can be used, and any suitable maximum and minimum frequencies can be used, in some embodiments.

Figure 1:
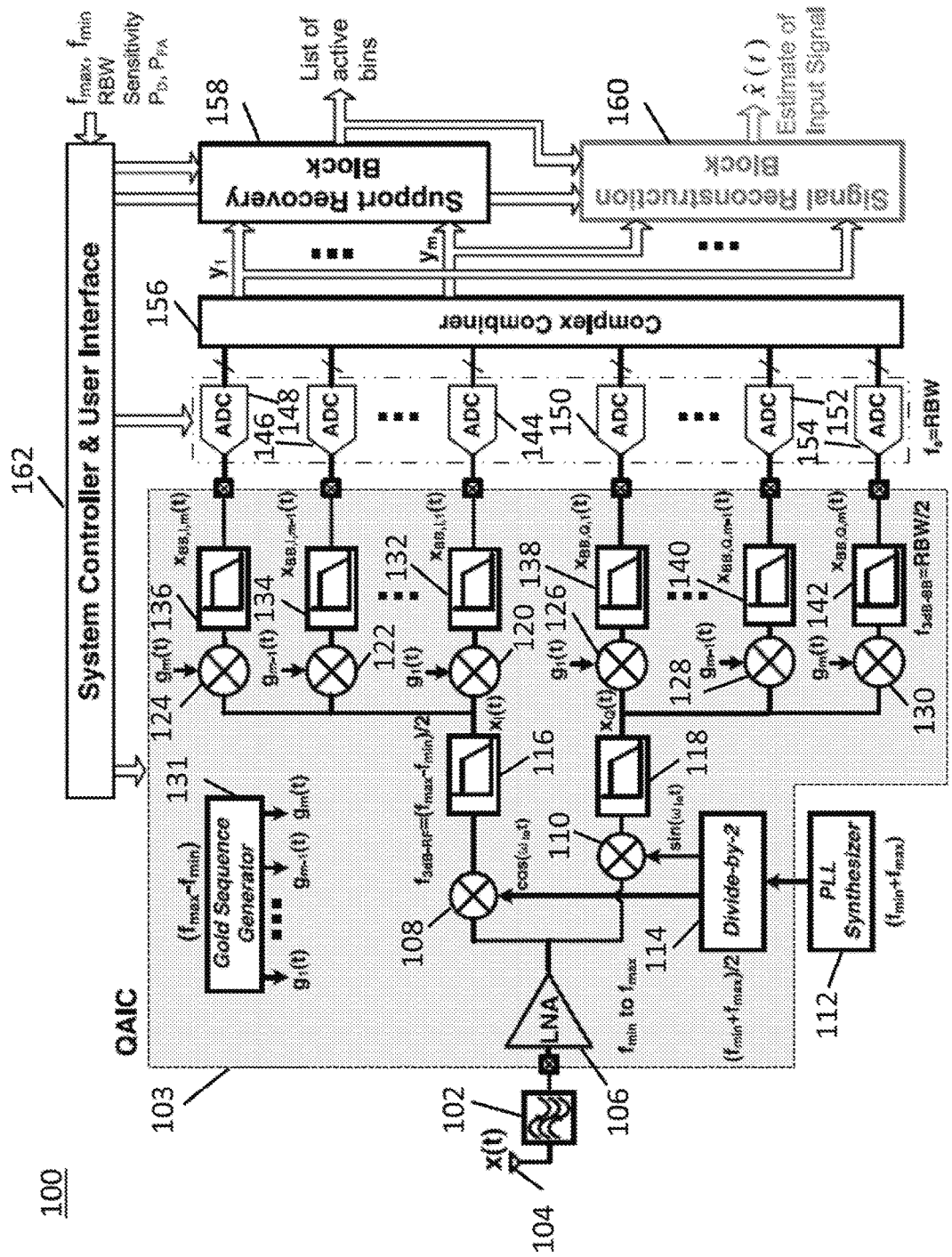
FIG. 1 is an example of a circuit for detecting interferers in accordance with some embodiments.

Turning to FIG. 1, an example 100 of a circuit for interferer detection in accordance with some embodiments is shown. As illustrated, circuit 100 includes an antenna 104, a quadrature analog-to-information converter (QAIC) front-end 103, a local oscillator source 112, analog-to-digital converters (ADCs) 144, 146, 148, 150, 152, and 154, a complex combiner 156, a support recovery block 158, a signal reconstruction block 160, and a system controller and user interface 162.

In accordance with some embodiments, to perform rapid interferer detection, circuit 100 downconverts an input signal x(t) with a local oscillator (LO) to a complex baseband signal $x_I(t)+jx_Q(t)$. $x_I(t)$ and $x_Q(t)$ are then multiplied by m unique pseudorandom noise (PN) sequences (e.g., Gold sequences) $g_m(t)$ to produce m branch signals for I and m branch signals for Q. The branch signals are then low pass filtered, converted from analog to digital form, and pairwise combined by a pairwise complex combiner. Finally, a support recovery function is used to identify interferers.

As shown in FIG. 1, QAIC front-end 103 includes a low noise amplifier (LNA) 106, mixers 108 and 110, a divide-by-two circuit 114, filters 116 and 118, mixers 120, 122, 124, 126, 128, and 130, filters 132, 134, 136, 138, 140, and 142, and a Gold sequence generator 131.

When an input signal x(t) 102 is received from antenna 104, the input signal is amplified by LNA 106. LNA 106 can be any suitable low noise amplifier in accordance with some embodiments. In some embodiments, a wideband noise-canceling low-noise amplifier can be used as LNA 106. A wideband noise-canceling low-noise amplifier can be used as LNA 106, for example, when impedance matching is required for a given instantaneous bandwidth (e.g., 1 GHz).

The output of LNA 106 is then provided to mixers 108 and 110, which mix the amplified signal with local oscillators $\cos(\omega_{lo}t)$ and $\sin(\omega_{lo}t)$, respectively. Mixers 108 and 110 can be any suitable mixers. For example, in some embodiments, the mixers can be current-driven passive I/Q mixers.

The local oscillators can be produced by any suitable source. For example, in some embodiments, the local oscillators can be produced by local oscillator source 112 in conjunction with divide-by-two circuit 114. Local oscillator source 112 can be any suitable source of a local oscillator signal, such as a phase lock loop synthesizer. The local oscillators can have any suitable frequency. For example, the local oscillator signal produced by source 112 can have a frequency of 6.4 GHz, and the local oscillators output by circuit 114 can be 3.2 GHz quadrature signals that have a 50% duty cycle.

The outputs of mixers 108 and 110 are filtered by filters 116 and 118 to produce $x_I(t)$ and $x_Q(t)$, respectively. Any suitable filters can be used for filters 116 and 118 in accordance with some embodiments. For example, low pass filters with a cut-off frequency of 0.5 GHz can be used for filters 116 and 118 in some embodiments.

Next, the signals $x_I(t)$ and $x_Q(t)$ output by filters 116 and 118 are provided to m branches for each of the I and Q paths for a total of M=2m branches. Any suitable number of branches can be used in some embodiments. For example, in some embodiments, the total number of branches M needed for successful signal recovery can be determined by the maximum number of supports (i.e., interferers), $K_0$, the length of the PN sequence, L, and a constant, C according to the equation: $M=C \cdot K_0 \cdot \log(L/K_0)$.

For the purposes of illustration, FIG. 1 shows one three of the m in-phase branches and three of the m quadrature-phase branches. In some embodiments, m may be equal to eight or any other suitable number. Within these three illustrative branches, the signal $x_I(t)$ is provided to mixers 120, 122, and 124, and the signal $x_Q(t)$ is provided to mixers 126, 128, and 130. Any suitable mixers can be used in some embodiments. For example, in some embodiments, the mixers can be current-driven passive I/Q mixers.

Mixers 120, 122, and 124 and mixers 126, 128, and 130 mix signals $x_I(t)$ and $x_Q(t)$, respectively, with unique Gold sequence $g_1(t)$, $g_{m-1}(t)$, and $g_m(t)$ for each branch m. More particularly, for example, mixers 120 and 126 mix signals $x_I(t)$ and $x_Q(t)$, respectively, with Gold sequence $g_1(t)$. As another example, mixers 122 and 128 mix signals $x_I(t)$ and $x_Q(t)$, respectively, with Gold sequence $g_{m-1}(t)$. As yet another example, mixers 124 and 130 mix signals $x_I(t)$ and $x_Q(t)$, respectively, with Gold sequence $g_m(t)$.

The Gold sequences can have any suitable length in some embodiments. For example, in some embodiments, the Gold sequences can have a length of 15, 31, 63 or 127.

Although FIG. 1 is described as mixing Gold sequences with $x_I(t)$ and $x_Q(t)$, any suitable pseudo random sequence (PRBS) can be used in some embodiments.

As another example, in some embodiments, maximal length PRBSs generated with linear feedback shift registers (LFSR) can be used. The sequence length L can be equal to $2^r-1$, where $r \in \mathbb{Z}^+$ for a maximal length LFSR type PRBS. The number of shift registers r in the LFSR structure can be chosen such that L is greater than or equal to the number of bins (or bands) in the frequency range ($f_{MAX}-f_{MIN}$) (e.g., 1 GHz (3.7 GHz ($f_{MAX}$)-2.7 GHz ($f_{MIN}$)) to be checked for interferers and the frequency of the PRBS ($f_{PRBS}$) is greater than the frequency span.

The output of mixer in each of the in-phase and quadrature phase branches (e.g., mixers 120, 122, 124, 126, 128, and 130) is filtered by a filter for that branch (e.g., one of filters 132, 134, 136, 138, 140, and 142). Any suitable filters can be used for these filters in accordance with some embodiments. For example, low pass filters with a cut-off frequency of RBW/2 (e.g., 10 MHz) can be used for these filters in some embodiments.

The output of the filters in each of the in-phase and quadrature phase branches (e.g., filters 132, 134, 136, 138, 140, and 142) is converted from analog to digital by an ADC for that branch (e.g., one of ADCs 144, 146, 148, 150, 152, and 154). Any suitable ADCs can be used for these ADCs in accordance with some embodiments, and these ADCs can have any suitable number of bits and sampling rate. For example, in some embodiments, 1 or 8 bit ADCs with sampling rates of equal to the RBW, or multiples thereof can be used.

The aggregate sampling rate for the ADCs is the number of branches multiplied by the sampling rate for each ADC. In some embodiments, the number of branches may be reduced by a factor q if the branch sampling rate is increased by a factor q to maintain the same aggregate sampling rate.

The outputs of the I and Q path branches are next pairwise added by complex combiner 156. As shown in block 302 of FIG. 3, this can be done by the complex combiner providing an output y for each pair of I and Q branches 1 through m as follows:

$$y_i = x_{BBIi} + j x_{BBQi}$$

The outputs of the complex combiner $y_1 \ldots y_m$ are provided to support recovery block 158 and signal reconstruction block 160.

Figure 3:
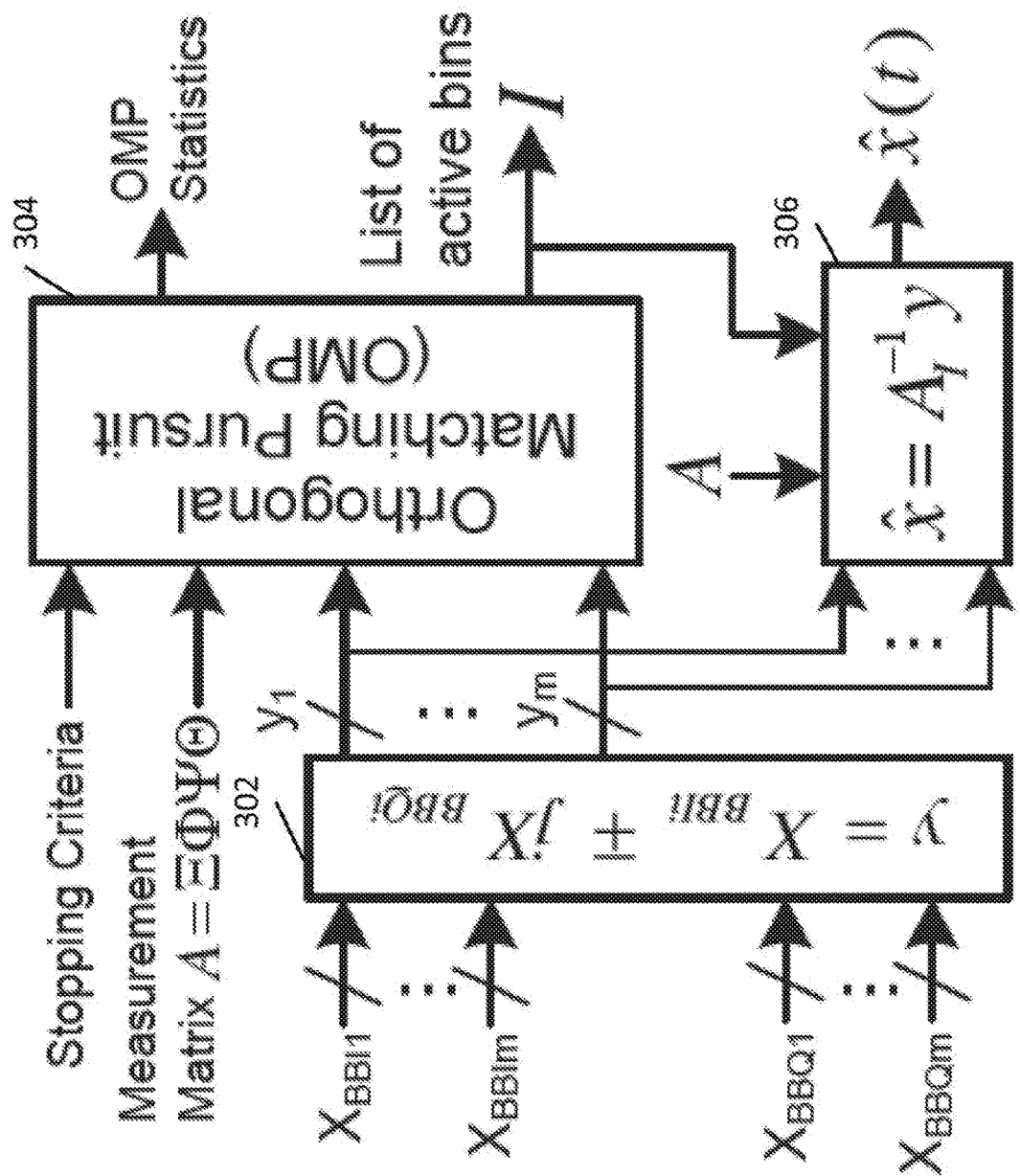
FIG. 3 is an example of a block diagram showing functions that can be performed by a complex combiner, a support recovery block, and a signal reconstruction block in accordance with some embodiments.

Within support recovery block 158, any suitable technique and any suitable hardware can be used to identify interferers. For example, in some embodiments, as shown in FIG. 3, the Orthogonal Matching Pursuit (OMP) technique (shown in block 304) can be used to find the input signal frequency bins (or bands) that exceed an adaptive threshold, and thus certain interferers. The OMP forms an estimate of the signal support (i.e., interferers) (active bins) one element at a time.

As also shown in FIG. 3, in addition to receiving the outputs of the complex combiner, the OMP receives stopping criteria and a measurement matrix A. Any suitable stopping criteria and measurement matrix A can be used in some embodiments. For example, in some embodiments, user specified parameters like $f_{MAX}$, $f_{MIN}$ and resolution bandwidth (RBW) (i.e., the frequency range divided by the number of bins (or bands)) can be used to generate the measurement matrix A, and user specified performance targets like sensitivity can be used to derive the adaptive stopping criteria. This threshold can be set to optimize the detection or false alarm probabilities, $P_D$ or $P_{FA}$. For example, the threshold can be set close to the noise floor to maximize performance in some embodiments.

Within signal reconstruction block 160, any suitable technique and any suitable hardware can be used to reconstruct the signal x(t). For example, as shown in FIG. 3, in some embodiments, the list (I) of active bins found by the OMP at block 304 can be used to reconstruct an estimate of the input signal x(t) at block 306. This can be done, for example, by forming a pseudoinverse of the reduced measurement matrix ($A_I$), and solving directly for x(t) from the complex combiner output values y.

Finally, system controller and user interface 162 can be used to configure circuit 100 according to user specified system constants and performance targets such as RBW, sensitivity, maximum and minimum frequencies of interest, $f_{MAX}$ and $f_{MIN}$, and detection and false alarm probabilities, $P_D$ and $P_{FA}$.

Figure 2:
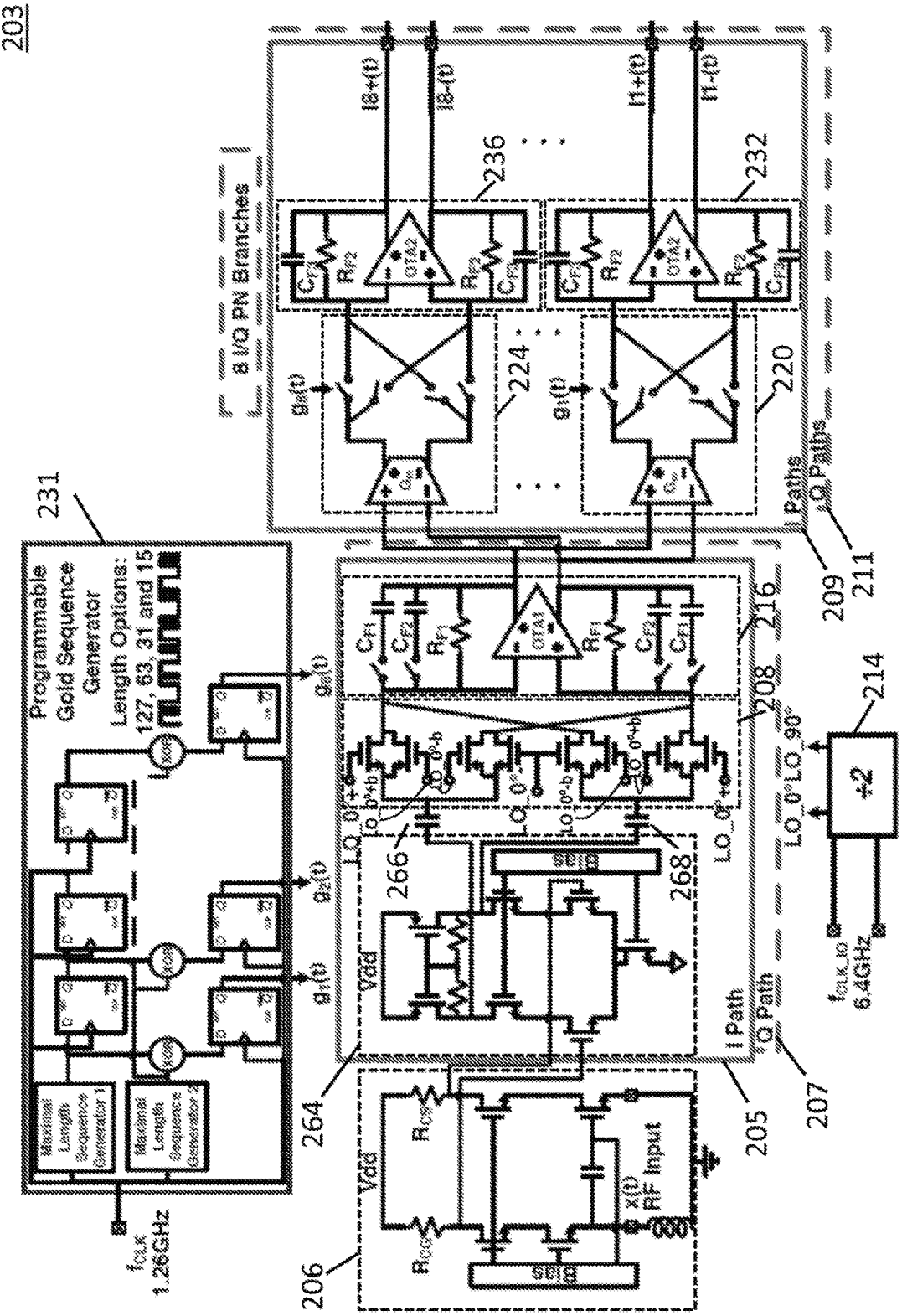
FIG. 2 is an example of a circuit for implementing a quadrature analog-to-information converter in accordance with some embodiments.

Turning to FIG. 2, an example 203 of a circuit for QAIC front-end 103 that can be used in accordance with some embodiments is illustrated. As shown, circuit 203 includes an LNA 206, a mixer 208, a transconductance amplifier 264, DC blocking capacitors 266 and 268, a divide-by-two circuit 214, a filter 216, mixers 220 and 224, a Gold sequence generator 231, and filters 232 and 236.

As also shown in FIG. 2, circuit 203 includes an I path 205 and a Q path 207. Q path 207 includes the same components as the components in I path 205 and receives the same signals from LNA 206. However, unlike I path 205 which receives LO_0° clock signals (i.e., LO_0°+, LO_0°+b, LO_0°−, and LO_0°−b), Q path 207 receives LO_90° signals (i.e., LO_90°+, LO_90°+b, LO_90°−, and LO_90°−b).

As further shown in FIG. 2, unlike in circuit 100, the output of LNA 206 (which is differential) is connected to a differential transconductance $G_m$ amplifier 264 (which can operate in any suitable range (e.g., such as 2.7 to 3.7 GHz)), which has its outputs connected to DC blocking capacitors 266 and 268, which are connected to differential mixer 208. Mixer 208 can be implemented in any suitable manner, such as using four pairs of CMOS transmission gate switches. In some embodiments, a non-overlap generator can be formed by two cross-coupled NAND gates with inverter chains to generate complementary phase clocks for use with transmission gate type passive mixer switches.

The output of mixer 208 is connected to filter 216, which can be implemented in any suitable manner, such as by a transimpedance amplifier that is configured as an RF I/Q filter, in some embodiments.

As still further shown in FIG. 2, circuit 203 includes I paths 209 and Q paths 211, which each include eight branches. Within each branch, there is a mixer (e.g., mixer 220 or 224) and a filter (e.g., filter 232 or 236). The input to these branches is connected to the output of filter 216 (for the I paths) or to the output of the equivalent filter (not shown) in Q path 207.

As yet further shown in FIG. 2, unlike in circuit 100, the output of filter 216 (which is differential) is connected to a differential transconductance $G_m$ amplifier in each branch of I paths 209, the outputs of each amplifier is connected to a differential switch (in the same branch) that is controlled by one of the Gold sequences produced by Gold sequence generator 231 to form a mixer for the branch (e.g., mixer 220 or 224).

The outputs of the mixers in each branch of the I paths 209 and the Q paths 211 are connected to a filter for the branch (e.g., filter 232 or 236). These filters can be implemented in any suitable manner, such as by a transimpedance amplifier that is configured as an RF I/Q filter, in some embodiments.

As still further shown in FIG. 2, Gold sequence generator 231 can be programmable in some embodiments. This can allow the RBW to be changed to different values (e.g., between 20 MHz and 10 MHz) by switching to corresponding PN length options (e.g., between 63-long and 127-long). In some embodiments, Gold sequence generator 231 can generate 8 ($2^n-1$) long Gold sequences by XORing two maximal length m-sequences generated by two n-flip-flop linear feedback shift registers.

As shown in FIG. 2, Gold sequence generator 231 can be clocked at L times RBW (which needs to be equal to or larger than the span) (e.g., a 1.26 GHz clock frequency). In some embodiments, any other suitable clock frequency can be used.

Figure 4:
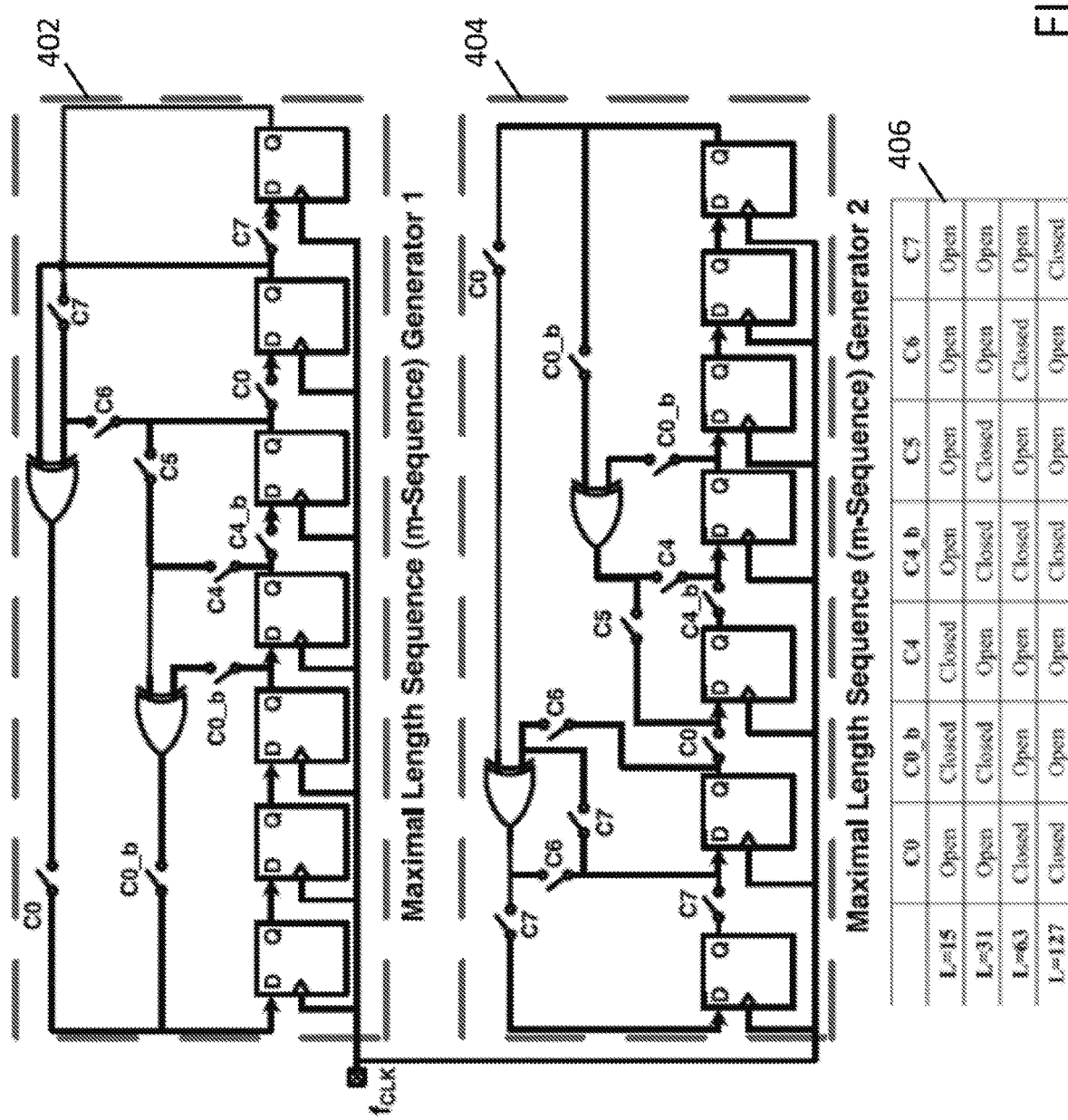
FIG. 4 is an example of a circuit for two maximal length sequence generators that can be used in accordance with some embodiments.
Figure 5:
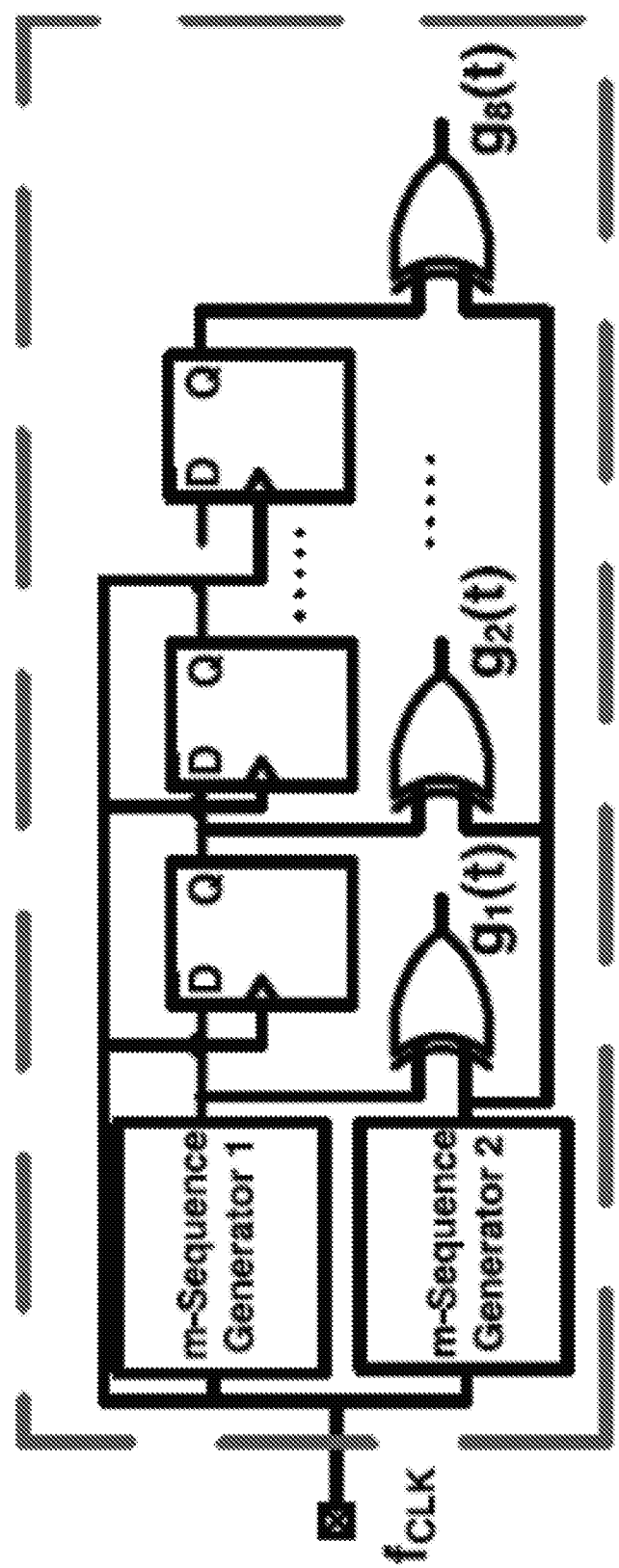
FIG. 5 is an example of a circuit for a Gold sequence generator that can be used in accordance with some embodiments.

FIGS. 4 and 5 show further details of Gold sequence generators that can be used in some embodiments.

As shown in FIG. 4, maximal length sequence generator 1 and maximal length sequence generator 2 shown in the Gold sequence generator 231 of FIG. 2 can be implemented as maximal length sequence generator 1 402 and maximal length sequence generator 2 404, respectively, in some embodiments. By changing the configuration of switches C0, C0$_b$, C4, C4$_b$, C5, C6, and C7, length options of 15, 31, 63 and 127 can be programmed for the Gold sequences output by Gold sequence generator 231 as shown in table 406.

As shown in FIG. 5, in some embodiments, in an alternate version of Gold sequence generator 231, the output flip flops at the outputs of the XOR gates can be omitted and the outputs of the XOR gates provided directly to the mixers of the branches in I paths 209 and Q paths 211.

Any suitable components technologies and sizes can be used to implement the circuit devices shown in FIGS. 1, 2, 4, and 5. For example, in some embodiments, these devices can be implemented in 65 nm CMOS general purpose device technology.

Figure 6:
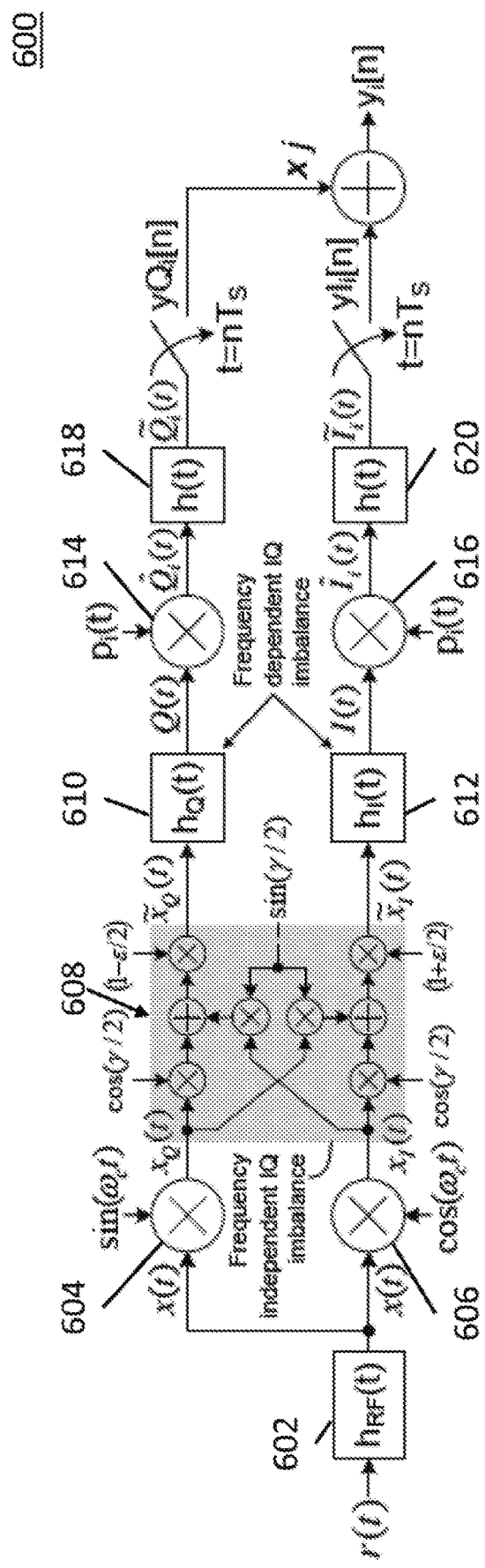
FIG. 6 is an example of a circuit diagram showing theory behind a mechanism for detecting interferers, including linear impairments (I/Q phase and gain imbalance) in accordance with some embodiments.

Turning to FIG. 6, an alternate circuit 600 for detecting interferers in accordance with some embodiment is shown to derive a set of equations that describe the operation of the mechanisms described herein.

For the purposes of illustration, impairments of the downconverter are included in the frequency domain model and only linear impairments are considered. The downconverter frequency independent impairment model at the output of box 608 can be described as follows:

$$\begin{pmatrix} \tilde{x}_I(t) \\ \tilde{x}_Q(t) \end{pmatrix} = \begin{pmatrix} \kappa_{11} & \kappa_{12} \\ \kappa_{21} & \kappa_{22} \end{pmatrix} \begin{pmatrix} x_I(t) \\ x_Q(t) \end{pmatrix}$$

The in-phase (I) and quadrature-phase (Q) local oscillator signals of the downconverter can be modeled as:

$$LO_I = \left(1 + \frac{\varepsilon}{2}\right)\cos\left(\omega_c t + \frac{\gamma}{2}\right)$$

$$LO_Q = \left(1 + \frac{\varepsilon}{2}\right)\sin\left(\omega_c t + \frac{\gamma}{2}\right)$$

wherein, parameters ε and γ specify the downconverter gain imbalance and phase imbalance and their impact on the local oscillators is shown in box 608.

The composite parameters in the downconverter frequency independent impairment model (described above) can be represented by:

$$\kappa_{11} = \left(1 + \frac{\varepsilon}{2}\right)\cos\left(\frac{\gamma}{2}\right)$$

$$\kappa_{12} = -\left(1 + \frac{\varepsilon}{2}\right)\sin\left(\frac{\gamma}{2}\right)$$

$$\kappa_{21} = -\left(1 - \frac{\varepsilon}{2}\right)\sin\left(\frac{\gamma}{2}\right)$$

$$\kappa_{22} = \left(1 - \frac{\varepsilon}{2}\right)\cos\left(\frac{\gamma}{2}\right)$$

The frequency dependent mismatch between the I and Q paths introduced by the downconverter and other components is modeled with $h_I(t)$ 612 and $h_Q(t)$ 610. For the purpose of this analysis, frequency dependent I, Q mismatch is ignored.

Let $x \in \mathcal{M}$ be a sparse multi-band signal received at the input to mixers 604 and 606 from filter 602. I(t) and Q(t) are the filtered outputs of the downconverter presented at the outputs of filters 612 and 610, respectively. Assume that $p_i(t)$ input to mixers 614 and 616 is a Tp periodic PRBS of length $L = 2L_0+1$, where $L_0 \in \mathbb{Z}^+$. Let $f_p = 1/T_P$ and therefore, $$p_i(t) = \sum_{n=-\infty}^{\infty} b_{i,n} e^{j2\pi n f_p t}$$

The weights $b_{i,n}$ can be evaluated by:

$$b_{i,n} = \begin{cases} \dfrac{1}{L}\sum_{k=0}^{L-1} \beta_{i,k} & \text{when } n = 0 \\[2mm] \sum_{k=0}^{L-1} \beta_{i,k} \theta_n \Psi_{n,k} & \text{when } n \neq 0 \end{cases}$$

where:

$\beta_{i,0} \ldots \beta_{i,L-1}$ are the amplitudes of the ith branch PRBS $$\theta_n = \left(1 - e^{-j\frac{2\pi}{L}n}\right)/j2\pi n$$

$$\Psi_{n,k} = e^{-j\frac{2\pi}{L}nk}$$

The Fourier transform of $\tilde{I}_i(t)=\hat{I}_i(t)*h(t)$ and $\tilde{Q}_i(t)=\hat{Q}_i(t)*h(t)$ at the outputs of filters 620 and 618, respectively, are given by:

$$\tilde{I}_i(f) = \sum_{n=-L_0}^{L_0} b_{i,n}[\kappa_{11} X_I(f - nf_p) + \kappa_{12} X_Q(f - nf_p)]$$

$$\tilde{Q}_i(f) = \sum_{n=-L_0}^{L_0} b_{i,n}[\kappa_{21} X_I(f - nf_p) + \kappa_{22} X_Q(f - nf_p)]$$

The inputs $\hat{I}_i(f)$ and $\hat{Q}_i(f)$ to filters 620 and 618, respectively, with impulse response h(t) are linear combinations of the $f_p$ shifted copies of I(f) and Q(f).

Since I(f), Q(f)=0 when f is not in the range $-(f_{MAX}-f_{MIN})/2$ to $(f_{MAX}-f_{MIN})/2$, the Fourier transforms above can be expressed with a finite sum. The signals $\tilde{I}_i(t)$ and $\tilde{Q}_i(t)$ are sampled at $f_s$ samples per second. The samples $yI_i[n]$ and $yQ_i[n]$ are combined and the output of the complex combine $y_i[n]$ are used to recover the support of the input signal $x(t)$. The Fourier transform of the signals $y_i[n]$ is given by:

$$Y_i(e^{j2\pi fT_s}) =$$
$$\frac{1}{T_s}\sum_{n=-L_0}^{L_0}\sum_{k=0}^{L-1}\{\beta_{i,k}\Psi_{n,k}\theta_n[\kappa_{11}X_I(f-nf_p)+\kappa_{12}X_Q(f-nf_p)] \mp j\beta_{i,k}$$

$$\Psi_{n,k}\theta_n[\kappa_{21}X_I(f-nf_p)+\kappa_{22}X_Q(f-nf_p)]\}$$

The operation of circuit 600 can be described by:
$$Y(e^{j2\pi fT_s}) = A\tilde{z}(f) = \Sigma\tilde{\Phi}\tilde{\Psi}\tilde{\Theta}K\tilde{z}(f)$$

where:

$\tilde{\Phi} \in \mathbb{R}^{2m \times 2L}$ is the sensing matrix (shown below);

$\tilde{\Psi} \in \mathbb{C}^{2L \times 2L}$ is the dictionary matrix (shown below);

$\tilde{\Theta} \in \mathbb{C}^{2L \times 2L}$ is a diagonal matrix (shown below) containing a set of complex weights; and the matrices $\Sigma$ and K represent the complex combiner action and the downconverter impairments, respectively.

$$\tilde{\Phi} = \left[\begin{array}{c|c}\Phi & 0 \\ \hline 0 & \Phi\end{array}\right]; \tilde{\Psi} = \left[\begin{array}{c|c}\Psi & 0 \\ \hline 0 & \Psi\end{array}\right]; \tilde{\Theta} = \left[\begin{array}{c|c}\Theta & 0 \\ \hline 0 & \Theta\end{array}\right]$$

The complex combiner action is described by the matrix:

$\tilde{\Sigma} \in \mathbb{C}^{m \times 2m}$ given by:

$$\sum = \begin{bmatrix} 1 & \cdots & 0 & \mp j & \cdots & 0 \\ \vdots & \ddots & \vdots & \vdots & \ddots & \vdots \\ 0 & \cdots & 1 & 0 & \cdots & \mp j \end{bmatrix}$$

The block diagonal matrices $\tilde{\Phi} \in \mathbb{R}^{2m \times 2L}$
$\tilde{\Psi} \in \mathbb{C}^{2L \times 2L}$
$\tilde{\Theta} \in \mathbb{C}^{2L \times 2L}$ described above include the matrices $\tilde{\Phi} \in \mathbb{R}^{m \times L}$
$\tilde{\Psi} \in \mathbb{C}^{L \times L}$
$\tilde{\Theta} \in \mathbb{C}^{L \times L}$ respectively.

The rows of the matrix $\Phi$ contain the amplitudes of the m unique pseudo-random bit sequences employed by the mechanisms described herein. $\Psi$ is a discrete Fourier transform matrix and $\Theta$ is a diagonal matrix containing the complex weights:

$$\theta_n = \left(1 - e^{-j\frac{2\pi}{L}n}\right)/j2\pi n$$

The action of the quadrature RF downconverter with frequency independent linear impairments is described by the matrix $K \in \mathbb{R}^{2L \times 2L}$ $$\mathcal{K} = \left[\begin{array}{ccc|ccc} \kappa_{11} & \cdots & 0 & \kappa_{1,2} & \cdots & 0 \\ \vdots & \ddots & \vdots & \vdots & \ddots & \vdots \\ 0 & \cdots & \kappa_{11} & 0 & \cdots & \kappa_{12} \\ \hline \kappa_{2,1} & \cdots & 0 & \kappa_{22} & \cdots & 0 \\ \vdots & \ddots & \vdots & \vdots & \ddots & \vdots \\ 0 & \cdots & \kappa_{2,1} & 0 & \cdots & \kappa_{22} \end{array}\right]$$

Note that K is an identity matrix for an impairment free downconverter.

The vector $\tilde{z}(f) \in \mathbb{C}^{2L}$ in $Y(e^{j2\pi fT_s})=A\tilde{z}(f)=\Sigma\tilde{\Phi}\tilde{\Psi}\tilde{\Theta}K\tilde{z}(f)$ includes all of the $(2L_0+1)$ frequency shifts of $X_I(f)$ and $X_Q(f)$ by $f_p$ Hz. The vector $\tilde{z}(f)$ can be described as follows:

$$\tilde{z}(f) = \begin{cases} \frac{1}{2}[X(f - f_c + L_0 f_p) + X(f + f_c + L_0 f_p)] \\ \vdots \\ \frac{1}{2}[X(f - f_c - L_0 f_p) + X(f + f_c - L_0 f_p)] \\ \frac{1}{2j}[X(f - f_c + L_0 f_p) - X(f + f_c + L_0 f_p)] \\ \vdots \\ \frac{1}{2j}[X(f - f_c - L_0 f_p) - X(f + f_c - L_0 f_p)] \end{cases}$$

Given $Y(e^{j2\pi fT_s})=A\tilde{z}(f)=\Sigma\tilde{\Phi}\tilde{\Psi}\tilde{\Theta}K\tilde{z}(f)$, we can attempt to recover the sparse vectors $\tilde{z}(f)$ from measurements Y(f), and hence determine the frequency support of the input signal x(t). This can be done efficiently using techniques from convex optimization if the matrix A respects the geometry of the sparse vector $\tilde{z}(f)$. Specifically, if for a small constant $\delta$, the following equation holds, then the sampling and reconstruction procedure will succeed:

$(1-\delta)\|s\|_2^2 \leq \|As\|_2^2 \leq (1+\delta)\|s\|_2^2 \forall 2K_0\text{-sparse } s$ For example, if in $Y(e^{j2\pi fT_s})=A\tilde{z}(f)=\Sigma\tilde{\Phi}\tilde{\Psi}\tilde{\Theta}K\tilde{z}(f)$, $\tilde{\Phi}$ is a random matrix (say with entries independent uniform $\pm 1$), the product $\tilde{\Phi}\tilde{\Psi}$ satisfies the requirement $(1-\delta)\|s\|_2^2 \leq \|As\|_2^2 \leq (1+\delta)\|s\|_2^2 \forall 2K_0\text{-sparse } s$ with high probability.

Figure 7:
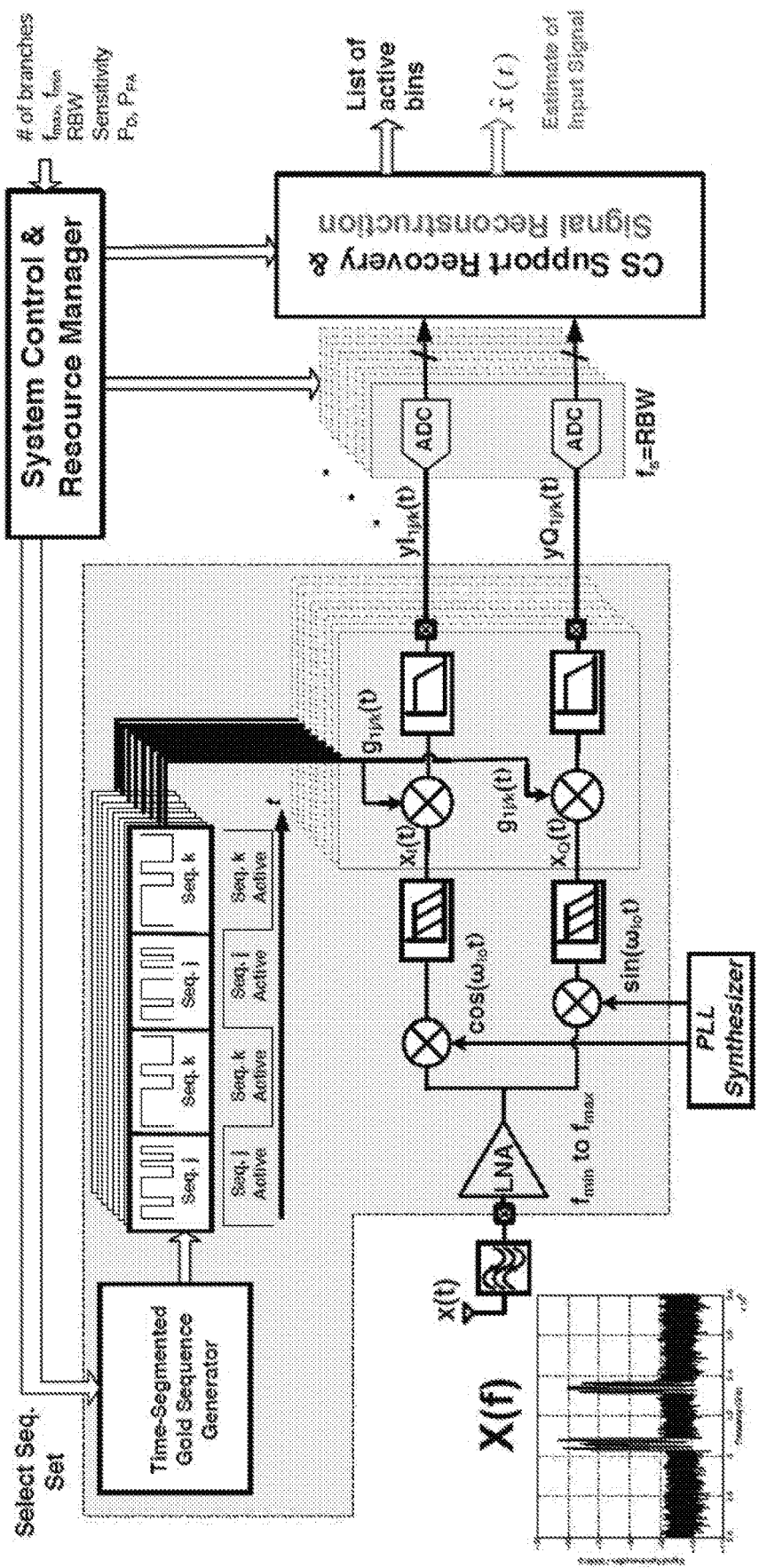
FIG. 7 is an example of a block diagram of a compressed sampling (CS) time-segmented quadrature analog-to-information converter in accordance with some embodiments.
Figure 8:
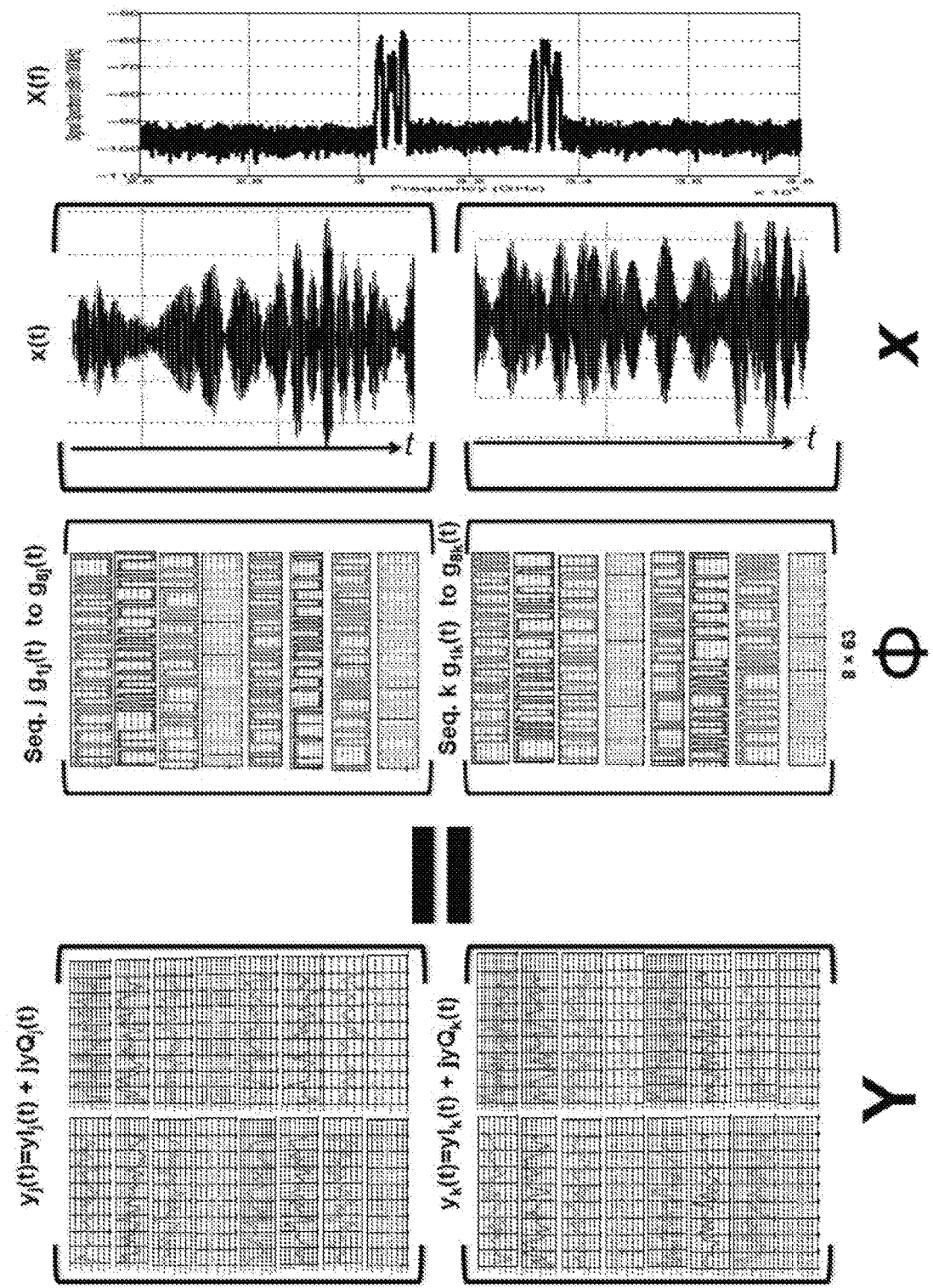
FIG. 8 is an example of a compressed sampling problem in accordance with some embodiments.
Figure 9:
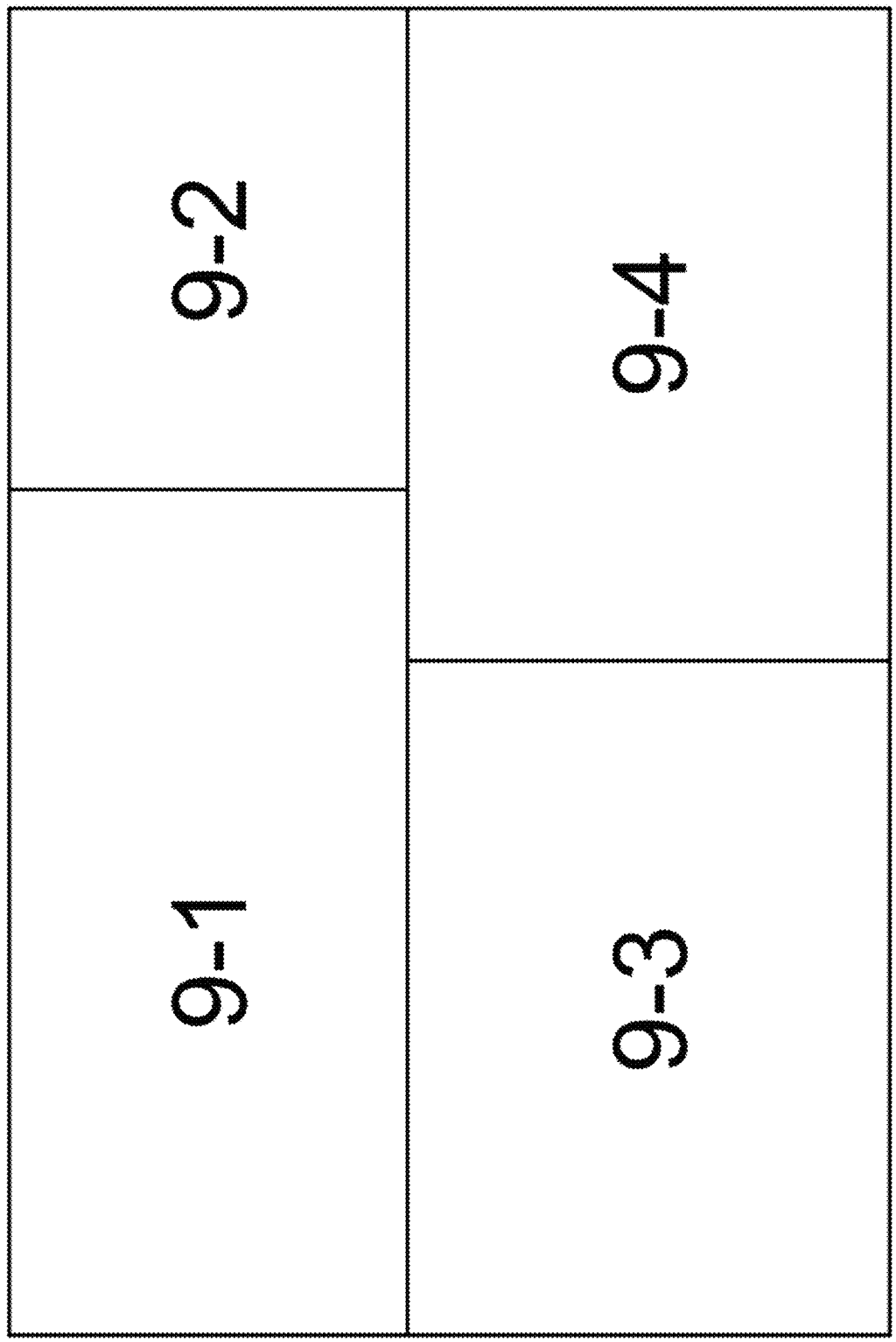
FIG. 9 is an example of a circuit implement of a rapid interfere detector using a compressed-sampling time-segmented quadrature analog-to-information converter (TS-QAIC) in accordance with some embodiments.
Figures 1, 9:
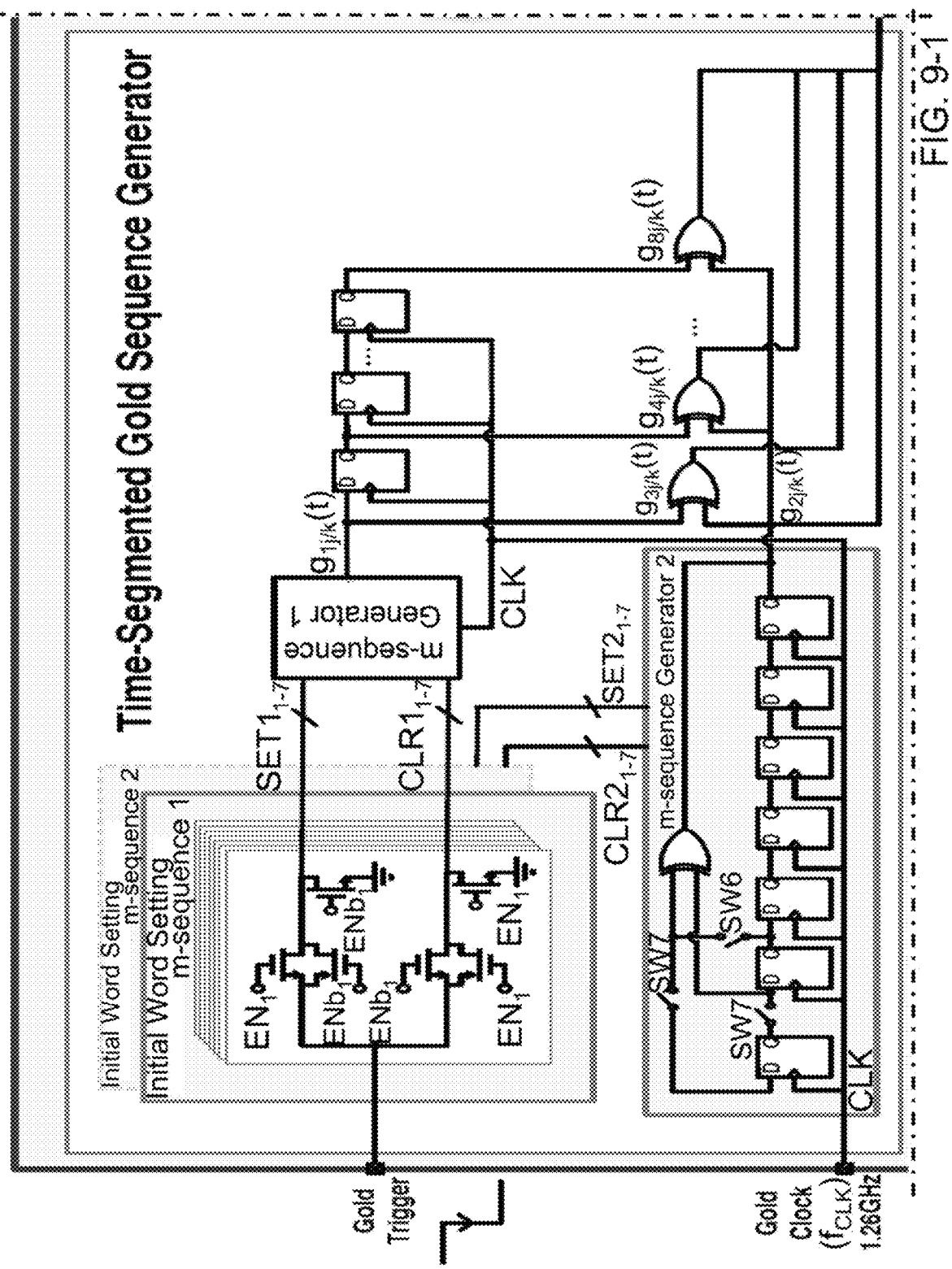
Figures 2, 9:
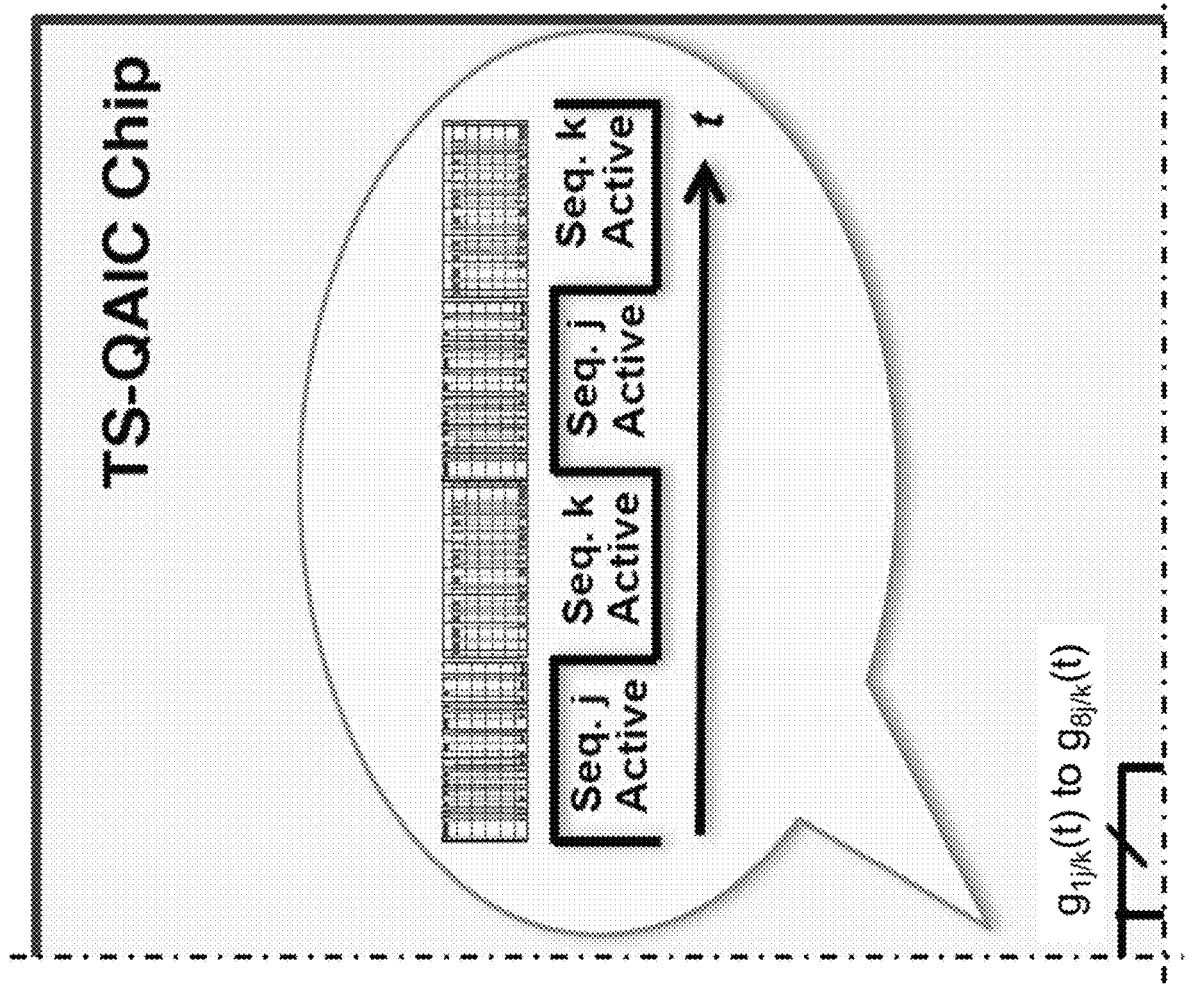
Figures 3, 9:
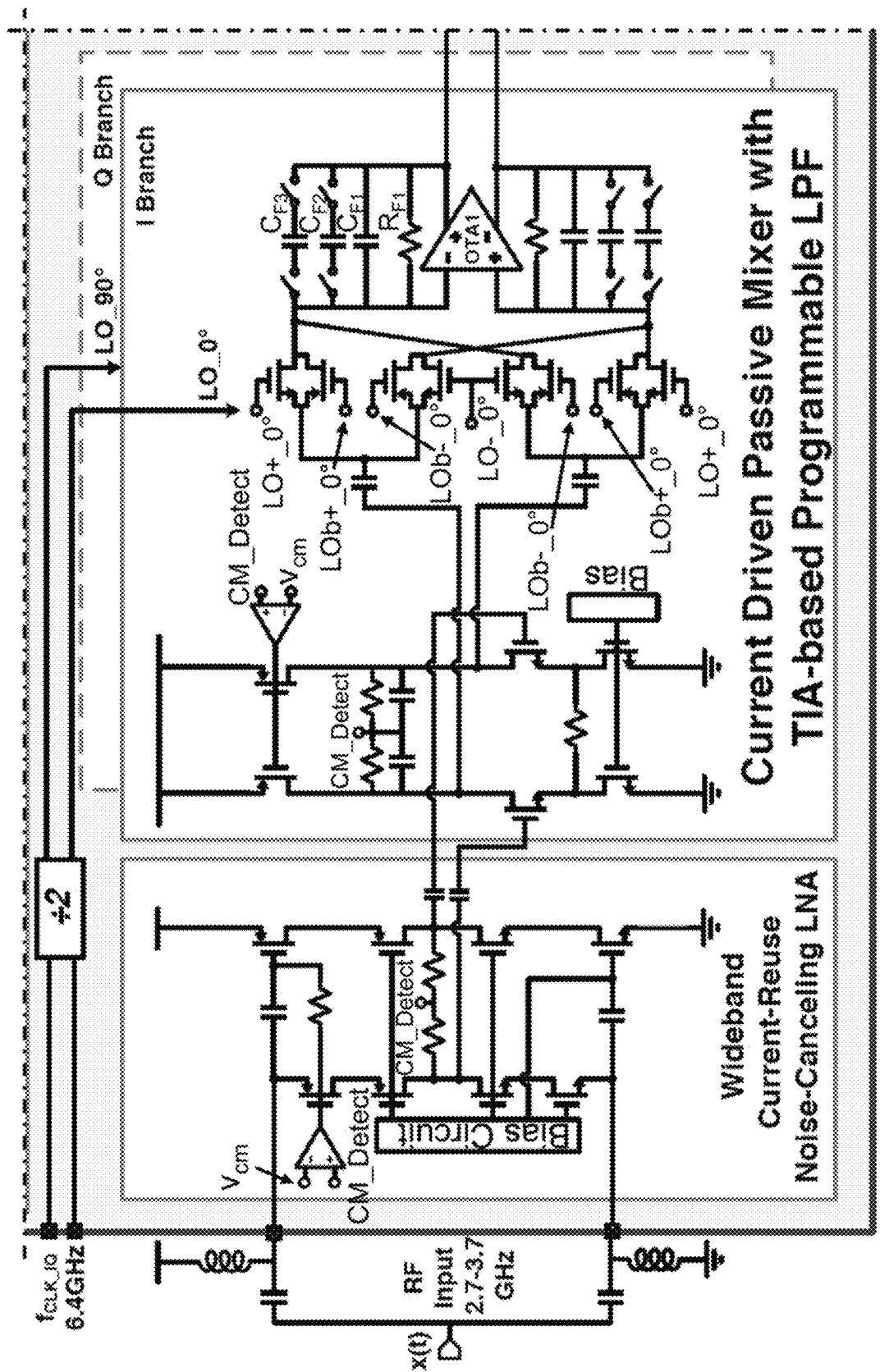
Figures 4, 9:
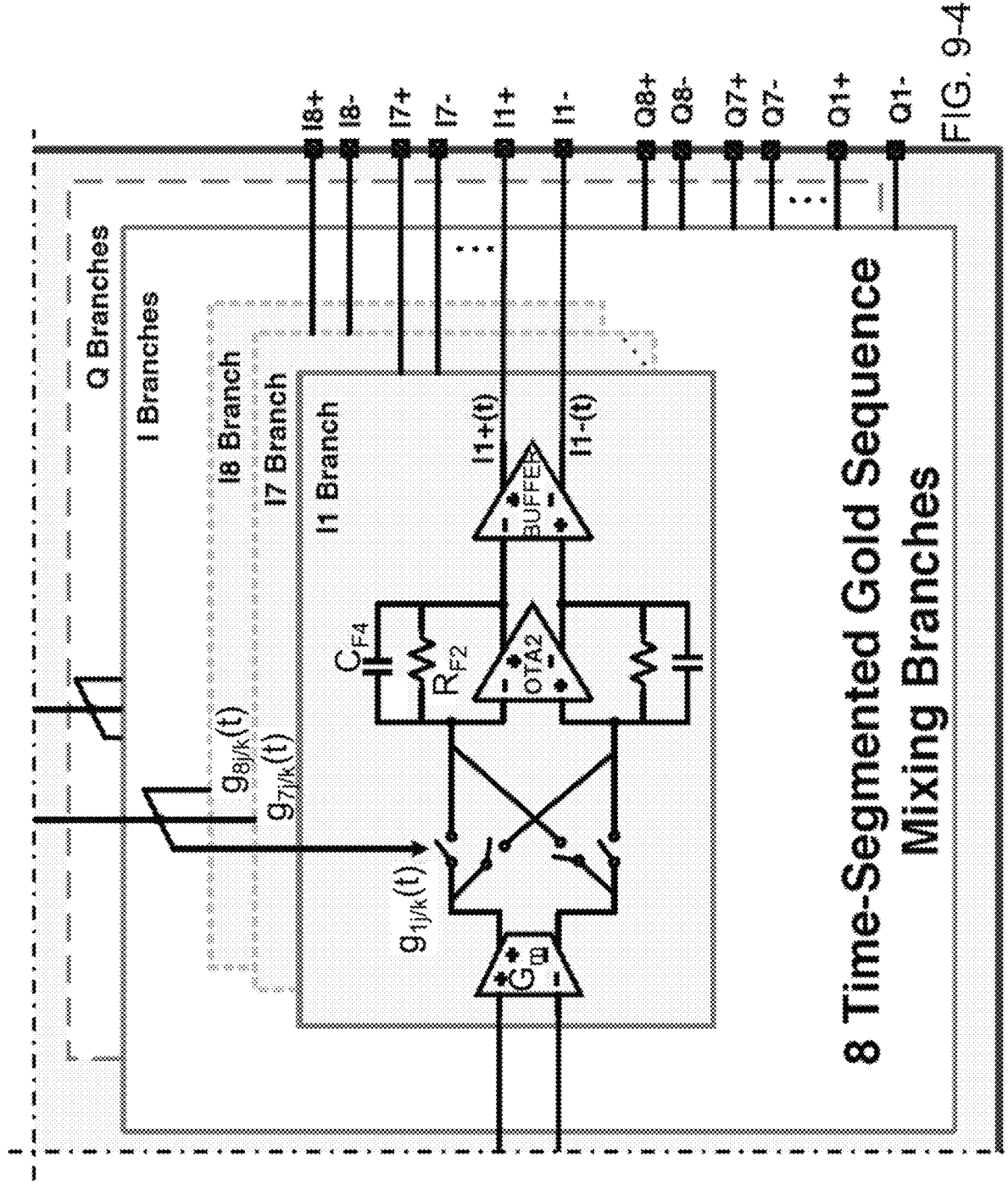

Turning to FIGS. 7-9, a time segmented QAIC is provided that implements a virtual extension of physical hardware through time segmentation and adaptive thresholding. This enables system scaling in multiple dimensions to meet user performance goals like number of detectable interferers, energy consumption and scan time, while limiting the cost and the complexity. In some embodiments, the approach can provide improved performance by virtually extending eight I/Q physical branches to sixteen I/Q through time segmentation.

In accordance with some embodiments, FIG. 7 shows an example of a rapid sensing approach exploiting compressed sampling (CS) with a time-segmented quadrature analog-to-information converter (TS-QAIC) in accordance with some embodiments. In some embodiments, this approach can deliver a 1 GHz instantaneous bandwidth (IBW) and can rapidly (<11 µs, for example) detect up to six interferers. The TS-QAIC can implement a virtual extension of physical hardware through time segmentation and adaptive thresholding, in some embodiments. This enables system scaling in multiple dimensions to meet user performance goals like number of detectable interferers, energy consumption, and scan time.

In some embodiments, the TS-QAIC maintains the advantages in power consumption and sensitivity of band pass CS approaches compared to low pass CS architectures, but it is able to detect twice the number of interferers with the same number of physical branches.

To detect six interferers, sixteen unique complex-domain measurements of the spectrum are needed.

In accordance with some embodiments, FIG. 7 shows a time-segmented rapid sensing approach in terms of a compressed sampling problem "y=Φx" (FIG. 8), where y are samples from the TS-QAIC, x is the interference with spectrum that remains stationary during slot boundaries or portions of sub-frames, and Φ is the sensing matrix constructed from two sets of unique gold sequences.

To limit silicon cost and complexity, TS-QAIC only commits eight I/Q branches on silicon and implements a virtual extension to sixteen I/Q branches through time segmentation. Assuming the spectrum is stationary for, for example, 11 µs, FIG. 8 shows how repeated application of the core hardware (eight I/Q branches) configured differently each time accomplishes virtual extension. For each successive application of the core hardware, the gold sequence generators are configured to generate a different set of eight unique sequences $g_{j/k}(t)$.

The 2.7-3.7 GHz TS-QAIC front-end chip (FIG. 9) employs a wideband current-reuse noise-canceling low-noise amplifier (e.g., 5.7 mW) and a wideband programmable bandwidth (e.g., BW settings of 125 MHz, 250 MHz, and 500 MHz) RF I/Q downconverter (18.37 mW incl. LO I/Q div. by 2). The RF I/Q downconverter is followed by eight I/Q baseband PN mixing branches (36.88 mW) that are driven by two sets of eight unique gold sequences. Baseband low pass filtering is performed with a transimpedance amplifier which is implemented as a two-stage operational transconductance amplifier with Miller compensation, and 20 MSps ADCs sample the branches; a pairwise complex combiner is used prior to complex-domain CS support recovery to identify the locations of six interferers. The on-chip gold sequence generator (6.68 mW) has a programmable set/reset option for two six flip-flop LFSRs to generate unique sequences based on the initial word settings. It generates six 63-long gold sequences by XORing two m-sequences generated by two six-flip-flop LFSRs operating at 1.26 GHz. For a 20 MHz resolution bandwidth (RBW), the eight PN I/Q mixing stages are driven by six time segmented 63-long gold sequences and two time-segmented 63-long m-sequences with sufficiently low cross correlation and low mutual coherence in the CS sensing matrix.

Figure 10:
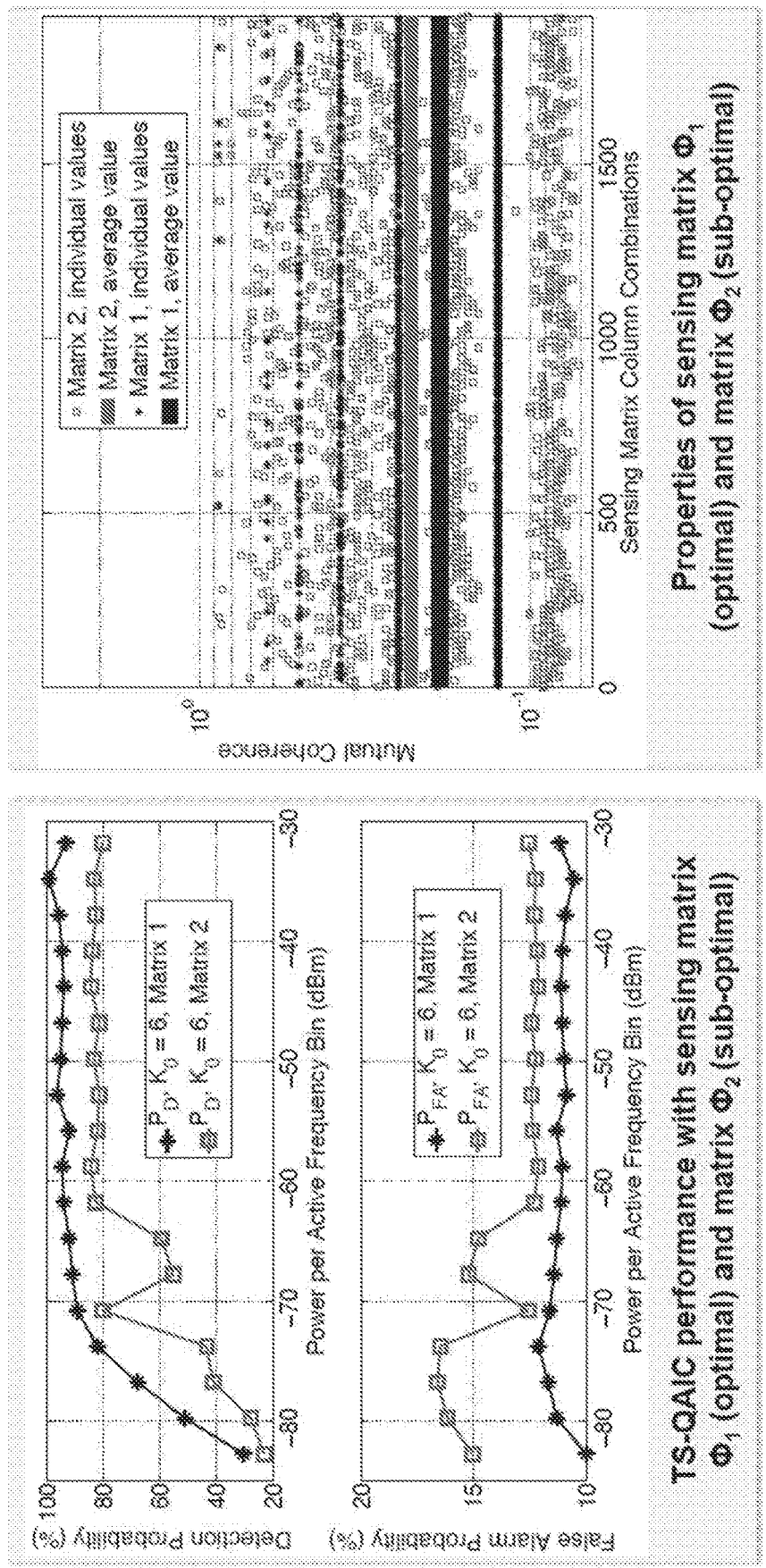
FIG. 10 is an example of an approach to selecting a sensing matrix Φ constructed from two time-segmented Gold sequence sets to detect K0=6 interferers in accordance with some embodiments.

For experimental validation of the TS-QAIC, multi-band RF signals with up to six (10 MHz wide upconverted filtered noise) bands are generated and fed into the chip. Gold sequences with low mutual coherence are selected and the outputs are digitized and stored for off-line CS DSP complex-domain support recovery with the CS orthogonal matching pursuit algorithm. FIG. 10 illustrates how to select gold sequence sets for optimal detection probability (PD) and false alarm probability (PFA) performance of the TS-QAIC. The measured PD and PFA for varying power levels per band for six interferers is shown when two sensing matrices with different properties each constructed from two time-segmented gold sequence sets are used. The measured PD is >90% for signals with a power level larger than −70 dBm/10 MHz when the optimal sensing matrix is selected, while the sub-optimal sensing matrix cannot deliver a PD>90%. The optimal sensing matrix has a lower average and a lower maximum mutual coherence which is needed for successful CS support recovery (FIG. 11).

Figure 11:
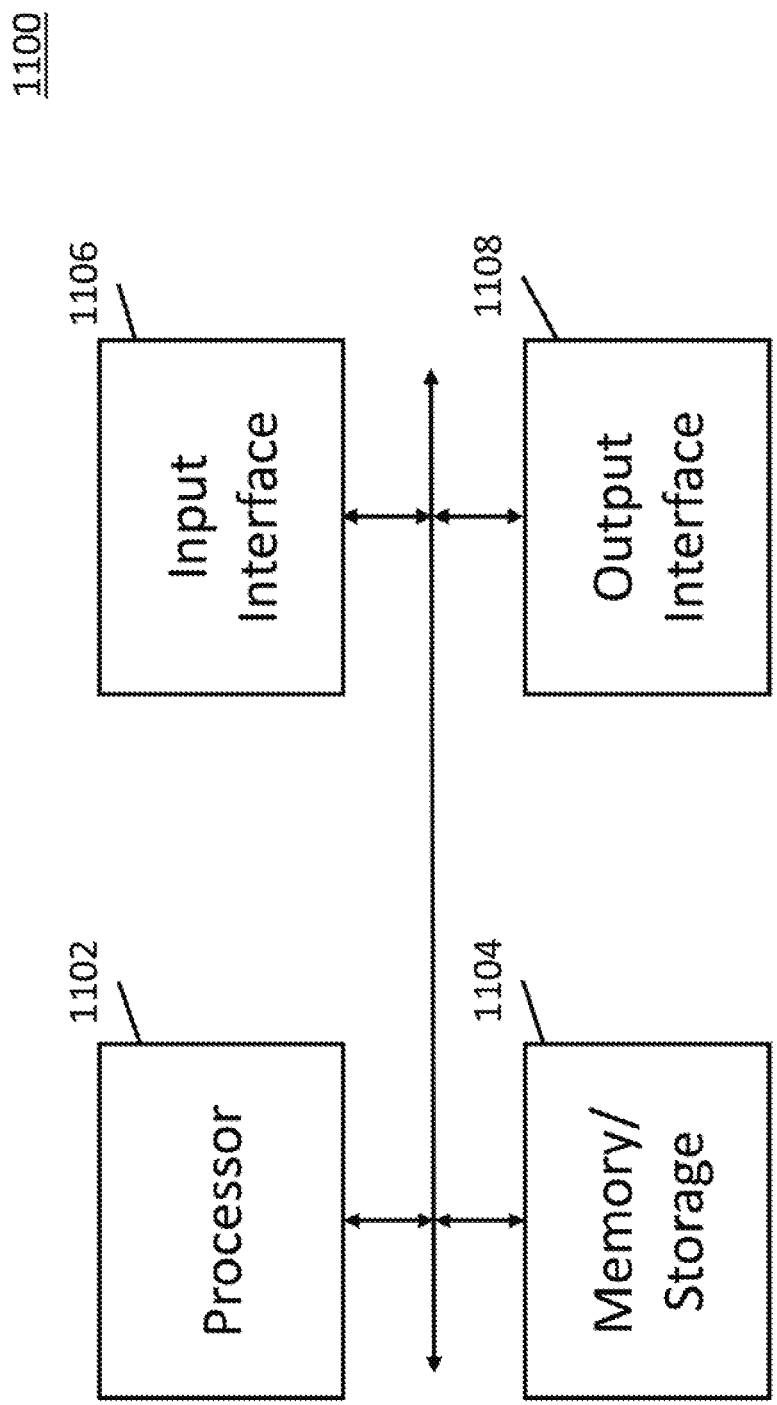
FIG. 11 is an example of hardware that can be used to implement a support recovery block, a signal reconstruction block, a system controller and user interface, and/or any other suitable portions of the circuits described herein in accordance with some embodiments.

FIG. 11 illustrates an example 1100 of hardware that can be used to implement one or more of support recovery block 158, signal reconstruction block 160, and system control and user interface 162. In some of more embodiments, two or more of support recovery block 158, signal reconstruction block 160, and system control and user interface 162 can be implemented in the same or different hardware 1100.

As shown in FIG. 11, hardware 1100 can include a hardware processor 1102, memory/storage 1104, an input interface 1106, an output interface 1108, and/or any other suitable components, which can be interconnected. Hardware 1100 can be implemented in some embodiments as any of a general purpose device (such as a computer) or a special purpose device (such as a client, a server, etc.).

Hardware processor 1102 can be any suitable hardware device for performing the functions associated with support recovery block 158, signal reconstruction block 160, system control and user interface 162, and/or any other component described herein, such as a microprocessor, a digital signal processor, a controller, etc., in some embodiments. For example, hardware processor 1102 can execute instructions stored in memory/storage 1104 for performing such functions.

In some embodiments, memory/storage 1104 can be any suitable memory and/or storage, such as random access memory, read only memory, programmable read only memory, flash memory, a hard disk, a solid state drive, non-transitory computer-readable media, etc. This memory/storage can store any suitable instructions, programs, data, information, etc.

Input interface 1106 can be any suitable interface for receiving data, programs, and/or any other suitable digital information.

Output interface 1108 can be any suitable interface for transmitting and/or presenting (e.g., via audio, video, etc.) data, programs, and/or any other suitable digital information.

In some embodiments, any suitable computer readable media can be used for storing instructions for performing the functions and/or processes described herein. Such computer readable media can be part of, or separate from, storage/memory 1104. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as random access memory (RAM), flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, mechanisms (which can include circuits, systems, methods, and computer readable media) for detecting interferers in a frequency range are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for detecting interferers, comprising:
   a first in-phase mixer that receives and mixes a radio frequency (RF) signal and an in-phase local oscillator signal to produce a first in-phase mixer output signal;
   a first quadrature-phase mixer that receives and mixes the radio frequency (RF) signal and a quadrature-phase local oscillator signal to produce a first quadrature-phase mixer output signal;
   a first in-phase filter that receives and filters the first in-phase mixer output signal and produces a first in-phase filtered signal;
   a first quadrature-phase filter that receives and filters the first quadrature-phase mixer output signal and produces a first quadrature-phase filtered signal;
   a first in-phase branch that comprises:
      a second in-phase mixer that receives and mixes the first in-phase filtered signal and a series of first pseudorandom noise signals to produce a series of second in-phase mixer output signals;
      a second in-phase filter that receives and filters the series of second in-phase mixer output signals to produce a series of second in-phase filtered signals; and
      a first in-phase analog-to-digital converter that receives the series of second in-phase filtered signals and produces a series of first in-phase digitized signals;
   a second in-phase branch that comprises:
      a third in-phase mixer that receives and mixes the first in-phase filtered signal and a series of second pseudorandom noise signals to produce a series of third in-phase mixer output signals;
      a third in-phase filter that receives and filters the series of third in-phase mixer output signals to produce a series of third in-phase filtered signals; and
      a second in-phase analog-to-digital converter that receives the series of third in-phase filtered signals and produces a series of second in-phase digitized signals;
   a first quadrature-phase branch that comprises:
      a second quadrature-phase mixer that receives and mixes the first quadrature-phase filtered signal and the series of first pseudorandom noise signals to produce a series of second quadrature-phase mixer output signals;
      a second quadrature-phase filter that receives and filters the series of second quadrature-phase mixer output signals to produce a series of second quadrature-phase filtered signals; and
      a first quadrature-phase analog-to-digital converter that receives the series of second quadrature-phase filtered signals and produces a series of first quadrature-phase digitized signals;
   a second quadrature-phase branch that comprises:
      a third quadrature-phase mixer that receives and mixes the first quadrature-phase filtered signal and the series of second pseudorandom noise signals to produce a third quadrature-phase mixer output signal;
      a third quadrature-phase filter that receives and filters the series of third quadrature-phase mixer output signals to produce a series of third quadrature-phase filtered signals; and
      a second quadrature-phase analog-to-digital converter that receives the series of third quadrature-phase filtered signals and produces a series of second quadrature-phase digitized signals;
   a complex combiner that combines the series of first in-phase digitized signals and the series of first quadrature-phase digitized signals to produce a series of first combined signals and that combines the series of second in-phase digitized signals and the series of second quadrature-phase digitized signals to produce a series of second combined signals;
   at least one hardware processor that receives the series of first combined signals and the series of second combined signals and that identifies a plurality of interferers in the RF signal utilizing the series of first combined signals and the series of second combined signals utilizing an orthogonal matching pursuit algorithm; and
   a Gold sequence generator that generates the series of first pseudorandom noise signals and the series of second pseudorandom noise signals, wherein each of the series of first pseudorandom noise signals is a different first Gold sequence and each of the series of second pseudorandom noise signals is a different second Gold sequence that is different from each of the first Gold sequences.

2. The circuit of claim 1, further comprising a low noise amplifier that outputs the RF signal.

3. The circuit of claim 1, wherein the quadrature-phase local oscillator signal is shifted 90 degrees from the in-phase local oscillator.

4. The circuit of claim 1, wherein at least one of the first in-phase filter, the second in-phase filter, the third in-phase filter, the first quadrature-phase filter, the second quadrature-phase filter, and the third quadrature-phase filter is implemented utilizing a transimpedance amplifier.

5. The circuit of claim 4, wherein the transimpedance amplifier is implemented utilizing a two-stage operational transconductance amplifier with Miller compensation.

6. The circuit of claim 1, wherein at least one of the first in-phase filter, the second in-phase filter, the third in-phase filter, the first quadrature-phase filter, the second quadrature-phase filter, and the third quadrature-phase filter is programmable.

7. The circuit of claim 1, wherein the at least one hardware processor also determines an estimate of an input signal represented by the RF signal.

8. The circuit of claim 1, wherein the Gold sequence generator generates the series of first pseudorandom noise signals and the series of second pseudorandom noise signals by XORing m-sequences.

9. The circuit of claim 8, wherein the m-sequences are generated utilizing linear-feedback shift registers.

10. The circuit of claim 1, wherein the in-phase local oscillator signal and the quadrature-phase local oscillator signal are produced utilizing a phase lock loop synthesizer.

11. A method for detecting interferers, comprising:
mixing a radio frequency (RF) signal and an in-phase local oscillator signal to produce a first in-phase mixer output signal;
mixing the radio frequency (RF) signal and a quadrature-phase local oscillator signal to produce a first quadrature-phase mixer output signal;
filtering the first in-phase mixer output signal to produce a first in-phase filtered signal;
filtering the first quadrature-phase mixer output signal to produce a first quadrature-phase filtered signal;
generating a series of first pseudorandom noise signals and a series of second pseudorandom noise signals, wherein each of the series of first pseudorandom noise signals is a different first Gold sequence and each of the series of second pseudorandom noise signals is a different second Gold sequence that is different from each of the first Gold sequences;
mixing the first in-phase filtered signal and the series of first pseudorandom noise signals to produce a series of second in-phase mixer output signals;
filtering the series of second in-phase mixer output signals to produce a series of second in-phase filtered signals;
analog-to-digital converting the series of second in-phase filtered signals to produce a series of first in-phase digitized signals;
mixing the first in-phase filtered signal and the series of second pseudorandom noise signals to produce a series of third in-phase mixer output signals;
filtering the series of third in-phase mixer output signals to produce a series of third in-phase filtered signals;
analog-to-digital converting the series of third in-phase filtered signals to produce a series of second in-phase digitized signals;
mixing the first quadrature-phase filtered signal and the series of first pseudorandom noise signals to produce a series of second quadrature-phase mixer output signals;
filtering the series of second quadrature-phase mixer output signals to produce a series of second quadrature-phase filtered signals;
analog-to-digital converting the series of second quadrature-phase filtered signals to produce a series of first quadrature-phase digitized signals;
mixing the first quadrature-phase filtered signal and the series of second pseudorandom noise signals to produce a series of third quadrature-phase mixer output signals;
filtering the series of third quadrature-phase mixer output signals to produce a series of third quadrature-phase filtered signals;
analog-to-digital converting the third quadrature-phase filtered signal to produce a second quadrature-phase digitized signal;
combining the series of first in-phase digitized signals and the series of first quadrature-phase digitized signals to produce a series of first combined signals and combining the series of second in-phase digitized signals and the series of second quadrature-phase digitized signals to produce a series of second combined signals; and
identifying at least one interferer in the RF signal utilizing the series of first combined signals and the series of second combined signals utilizing an orthogonal matching pursuit technique.

12. The method of claim 11, further comprising amplifying an input signal to produce the RF signal utilizing a low noise amplifier.

13. The method of claim 11, wherein the quadrature-phase local oscillator signal is shifted 90 degrees from the in-phase local oscillator.

14. The method of claim 11, wherein at least one of the filtering the series of second in-phase mixer output signals, the filtering the series of third in-phase mixer output signals, the filtering the series of second quadrature-phase mixer output signals, the filtering the series of third quadrature-phase mixer output signals is implemented utilizing a transimpedance amplifier.

15. The method of claim 14, wherein the transimpedance amplifier is implemented utilizing a two-stage operational transconductance amplifier with Miller compensation.

16. The method of claim 11, wherein at least one of the filtering the series of second in-phase mixer output signals, the filtering the series of third in-phase mixer output signals, the filtering the series of second quadrature-phase mixer output signals, the filtering the series of third quadrature-phase mixer output signals is implemented utilizing a programmable filter.

17. The method of claim 11, further comprising determining an estimate of an input signal represented by the RF signal.

18. The method of claim 11, wherein generating the series of first pseudorandom noise signals and the series of second pseudorandom noise signals is implemented by XORing m-sequences.

19. The method of claim 18, wherein the m-sequences are generated utilizing linear-feedback shift registers.

20. The method of claim 11, wherein the in-phase local oscillator signal and the quadrature-phase local oscillator signal are produced utilizing a phase lock loop synthesizer.

* * * * *